(12) United States Patent
Zecha et al.

(10) Patent No.: US 8,586,686 B2
(45) Date of Patent: Nov. 19, 2013

(54) PROCESS FOR PREPARING VINYL ACETATE-ETHYLENE COPOLYMERS BY MEANS OF EMULSION POLYMERIZATION

(75) Inventors: Helmut Zecha, Burghausen (DE); Gerhard Kögler, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/202,911

(22) PCT Filed: Feb. 19, 2010

(86) PCT No.: PCT/EP2010/052103
§ 371 (c)(1),
(2), (4) Date: Aug. 23, 2011

(87) PCT Pub. No.: WO2010/097340
PCT Pub. Date: Sep. 2, 2010

(65) Prior Publication Data
US 2012/0015201 A1    Jan. 19, 2012

(30) Foreign Application Priority Data

Feb. 24, 2009 (DE) .......................... 10 2009 001 097

(51) Int. Cl.
*C08F 218/08* (2006.01)
(52) U.S. Cl.
USPC ......................................... 526/331; 526/212
(58) Field of Classification Search
USPC ....................................................... 526/331
See application file for complete search history.

(56) References Cited

U.S. PATENT DOCUMENTS

| | | | |
|---|---|---|---|
| 3,644,262 A | 2/1972 | Stehle | |
| 3,708,388 A | 1/1973 | Lindemann | |
| 3,769,151 A | 10/1973 | Knutson | |
| 3,817,896 A | 6/1974 | Bergmeister | |
| 4,267,090 A | 5/1981 | Heimberg | |
| 5,571,860 A | 11/1996 | Kukkala | |
| 5,747,578 A * | 5/1998 | Schmitz et al. | 524/502 |
| 2007/0179245 A1 * | 8/2007 | Stark et al. | 524/806 |
| 2008/0206582 A1 | 8/2008 | Scholtyssek | |

FOREIGN PATENT DOCUMENTS

| | | |
|---|---|---|
| CN | 1930199 A | 3/2007 |
| DE | 1595402 A1 | 3/1970 |
| DE | 2112769 A1 | 9/1972 |
| DE | 19943104 A1 | 3/2001 |
| DE | 10329594 A1 | 1/2005 |
| EP | 0385734 A2 | 9/1990 |
| EP | 385734 B1 | 8/1994 |
| EP | 279384 B1 | 12/1994 |
| EP | 0890625 A1 | 1/1999 |
| EP | 1212383 B1 | 1/2004 |
| EP | 0890625 B1 | 11/2005 |
| GB | 1117711 A | 6/1968 |
| GB | 1546275 A | 5/1979 |

OTHER PUBLICATIONS

PVA from Hanway Co. downloaded from www.hanwaycompany.com/pvaen.html on Jan. 4, 2013.*
Elias, H. G., Polymere, Von Monomeren und Makromolekulen zu Werkstoffen; Huthig & Wepf Verlag, 1996, 202 (with English Abstract).
Fikentscher, Cellulosechemie 13 (1932) 58 (with English Abstract).
Flory, P. J., Principles of Polymer Chesmitry, Cornell University Press, 1953, p. 308.
International Search Report issued in PCT/EP2010/052103 filed Feb. 19, 2010, mailed Jul. 15, 2010.
Philippoff, W., Viskostitat der Kolloide, Verlag von Theodor Steinkopff, 1942, p. 172 (with English Abstract).
Poly(vinylesters), 2005, Ullmann's Encyclopedia of Industrial Chemistry (online).
http://www.hanwaycompany.com/pvabig5.htm, 4 pgs., Mar. 11, 2013.
http://www.hanwaycompany.com/pvaenhtm, 3 pgs., Mar. 11, 2013.

* cited by examiner

*Primary Examiner* — Vu A Nguyen
(74) *Attorney, Agent, or Firm* — RatnerPrestia

(57) ABSTRACT

A process for preparing a vinyl acetate-ethylene copolymer by means of free-radically initiated emulsion polymerization of vinyl acetate and ethylene and, optionally, further comonomers, performed in the presence of at least one protective colloid and at least one nonionic, ethoxylated emulsifier with an alkyl radical or at least one ethylene oxide-propylene oxide copolymer, and in the absence of chain transfer agent, and, before the initiation of the polymerization, 10% to 70% by weight of the vinyl acetate monomer and 40% to 100% by weight of the ethylene monomer are included in the initial charge, up to 100% by weight of the protective colloid fraction is included in the initial charge, at least 25% by weight of the emulsifier fraction is included in the initial charge, and the remaining fractions of monomers, protective colloid and emulsifier are metered in during the polymerization. A defined criterion of process COP is met.

14 Claims, No Drawings

PROCESS FOR PREPARING VINYL ACETATE-ETHYLENE COPOLYMERS BY MEANS OF EMULSION POLYMERIZATION

CROSS REFERENCE TO RELATED APPLICATIONS

This application is the national phase filing of international patent application No. PCT/EP2010/052103, filed 19 Feb. 2010, and claims priority of German patent application number 10 2009 001 097.1, filed 24 Feb. 2009, the entireties of which applications are incorporated herein by reference.

FIELD OF THE INVENTION

The invention relates to a process for preparing vinyl acetate-ethylene copolymers by means of emulsion polymerization for the purpose of producing adhesives featuring improved adhesion/cohesion balance. The invention relates more particularly to a process for preparing vinyl acetate-ethylene copolymers by means of emulsion polymerization for the purpose of producing adhesives for bonding polymer substrates to cellulosic materials, preferably polystyrene and polyethylene terephthalate films to paper or cardboard, featuring improved adhesion/cohesion balance.

BACKGROUND OF THE INVENTION

Processes of the emulsion polymerization of vinyl acetate (VAC) with ethylene, optionally with further comonomers, in aqueous phase for the purpose of preparing polymer dispersions are long established. In order to achieve colloidal stability in the dispersions produced, the polymerization process uses water-soluble polymers such as, for example, polyvinyl alcohols, cellulose derivatives and polyvinylpyrrolidones as protective colloids or low molecular mass surface-active substances, referred to as emulsifiers or surfactants. Also long and well established, for the purpose of achieving good colloidal stability and/or of regulating the particle sizes, is the use of combinations of polyvinyl alcohols and emulsifiers during the polymerization.

DE-A 1595402 describes a process in which the rate of incorporation of ethylene into vinyl acetate-ethylene copolymers is improved by the inclusion of at least 75% of the vinyl acetate monomer in the initial charge. The polymerization takes place in the presence of nonionic emulsifiers. DE-A 2112769, for the purpose of ensuring a uniform polymerization profile, recommends, for the copolymerization of vinyl esters with ethylene, using a redox initiator system, including the reducing agent with the vinyl ester fraction, the ethylene and the dispersants fully in the initial charge, and metering in only the oxidizing component. U.S. Pat. No. 3,644,262 describes a process for preparing VAE dispersions that leads to improved rates of ethylene incorporation. To achieve this, the vinyl acetate fraction and the emulsifier and/or protective colloid fraction are metered in full or included only in very small fractions in the initial charge. This process allows up to about 20% of ethylene to be incorporated in the copolymer at low pressures and temperatures. A disadvantage is that none of the products produced ensures adequate adhesion between polymer substrates and paper or cardboard.

The aqueous polymer dispersions based on vinyl acetate and ethylene (VAE dispersions) that are produced in this way can be used with advantage as binders, more particularly for adhesives, for paints or for bonding fibre to nonwoven web. Over the course of the years, the requirements imposed on the profile of properties of such VAE dispersions have become increasingly more specific. For example, in the context of the adhesive utility, a trend has become evident to impose specific requirements on the bonding of materials with low surface energy, as for example when bonding polymer films to cellulosic materials, especially to paper and cardboard. Customary VAE dispersions are unsuitable for this purpose, providing inadequate adhesion on the part of the adhesively bonded assembly. A variety of efforts have therefore been undertaken to provide VAE dispersions with improved adhesion.

U.S. Pat. No. 3,708,388 describes adhesives based on vinyl acetate-ethylene copolymers that are stabilized exclusively with alkylphenol ethoxylate emulsifier(s) or with protective colloid and such emulsifiers, that have a defined intrinsic viscosity and that can be used for the lamination of films. In the preparation process, at least 75% of the vinyl acetate (in the examples 96.5% to 100%) is included in the initial charge. For the purpose of improving the mechanical strength at high temperatures, the use of crosslinkers is advised.

EP 1212383 B1 describes a process for producing adhesives featuring improved adhesion. It operates by admixing aqueous dispersions, produced by emulsion polymerization, after the end of the polymerization, subsequently, with 0.3% to 3.0% by weight of one or more emulsifiers, based on the total weight of the dispersion. The specification teaches that an improvement in adhesion occurs only on subsequent addition of the emulsifier, whereas the use of emulsifier during the polymerization is said not to result in any improvement in adhesion. Disadvantageous features of this procedure are that a balanced trade-off between adhesion and cohesion is not provided, the adhesion to polystyrene and polyester films is much too low, and the setting rate of the dispersions is too low.

EP 890625 B1 describes an improved vinyl acetate-ethylene (VAE) latex polymer, and a process for preparing it, which is said to be suitable as an adhesive for packaging and for difficult-to-bond surfaces such as polyethylene, polyester, metallized polyester and oriented polypropylene. The polymer is characterized by means of particular temperature-dependent values of the storage modulus at a defined test frequency. For its preparation, the use of regulators is advised, and, in the polymerization process, less than 15% of the vinyl acetate is included in the initial reactor charge, and the vinyl acetate content is maintained during the polymerization at less than 5%. Polymer dispersions obtainable in this way in fact possess a high adhesion of difficult-to-bond polymer films to paper or textile. The disadvantage of the polymers thus produced, however, is that the cohesion of the adhesive bond is substantially too low, since the profile of requirements for the storage modulus does not allow sufficiently high cohesion. Moreover, alkylphenol ethoxylate having 4 to 100 ethylene oxide units is used as an emulsifier. Such emulsifiers, however, are extremely problematic on account of their environmental and health burden.

EP 385734 B1 describes a VAE copolymer and a polymerization process for its preparation, yielding an aqueous polymer dispersion having a solids content of 65% to 75%. The VAE copolymer is said to be suitable as an adhesive for a wide variety of substrates, with a high setting rate. It is prepared using a dispersant mixture comprising partially hydrolysed polyvinyl alcohol and a nonionic polyoxyethylene emulsifier with a defined HLB. The polymerization process is characterized in that 40% to 90% by weight of the vinyl acetate are incorporated by emulsification into an aqueous solution comprising the entire polyvinyl alcohol, the entire emulsifier and the entire reducing agent, thereby forming a stable emulsion, and subsequently, following injection of ethylene, the remaining 10% to 60% by weight of the vinyl acetate is metered in. A particular feature of the operation that is emphasized is the use of 40% to 90% of the vinyl acetate in the preliminary emulsion step, the remainder being metered in during the polymerization. The process does not lead to a carefully weighed balance between adhesion and cohesion; the adhesion to polystyrene and polyester films is too low.

U.S. Pat. No. 4,267,090 describes a process for preparing VAE dispersions, with the objective of improving the wettability of polyvinyl chloride substrate and the setting rate, with continued high or improved cohesion, through the use of defined amounts of emulsifier (not less than 1% and not more than 2%). The polymerization process is further characterized in that the vinyl acetate and the emulsifier fraction are part included in the initial charge and part metered in. The protective colloid fraction and the oxidizing agent in U.S. Pat. No. 4,267,090 are included fully in the initial charge. Polymers in accordance with U.S. Pat. No. 4,267,090 do not result in the desired, carefully weighed balance of adhesion and cohesion, and provide inadequate adhesion values for polystyrene and polyester films. To obtain the requisite cohesion, determined by a creep test, the "inherent viscosity" is supposed to have a value of at least 1.9 dl/g (with the details in U.S. Pat. No. 4,267,090, corresponding to an intrinsic viscosity of 1.95 dl/g) for the polymer fully hydrolysed in concentrated acetic acid. For the unhydrolysed VAE polymer with an ethylene fraction, according to the examples given, of 13.6% by weight, based on total monomer, the molar mass is higher by a factor of 1.73 than for the fully hydrolysed polymer. According to the known relationship between viscosity average of the molar mass M and intrinsic viscosity $[\eta]$ (H. G. Elias, Polymere, Von Monomeren and Makromolekülen zu Werkstoffen; Hüthig & Wepf Verlag, 1996, page 202 ff): $[\eta]=a\,M^{\alpha}$ (where $\alpha=0.764$), accordingly, the intrinsic viscosity of the unhydrolysed polymer is higher by a factor of 1.52 and is therefore at least $[\eta]=2.96$ dl/g (corresponding to a K value for the polymer of at least 125).

U.S. Pat. No. 5,571,860 proposes improving the setting rate, heat stability and adhesion of adhesives based on vinyl acetate-ethylene copolymers by copolymerizing them with N-vinyl-formamide or N-vinylpyrrolidone. The heat stability is further improved by incorporation of 0.5% to 10% by weight of crosslinkable monomer, more particularly glycidyl methacrylate (GMA). The polymerization process used provides for 70% of the vinyl acetate employed to be included, together with 90% of the dispersants employed, in the initial charge to the reactor, with the remainder metered in. A dispersant used is polyvinyl alcohol, optionally in a mixture with emulsifier. A disadvantage is the copolymerization of N-vinylformamide or N-vinylpyrrolidone, as it requires relatively high polymerization temperatures and hence relatively high pressures, and hinders the incorporation of ethylene.

EP 279384 B1 describes the preparation of vinyl acetate-ethylene copolymer dispersions with suitability as packaging adhesives. It was found that, when using a combination of low molecular mass polyvinyl alcohol and nonionic emulsifier to stabilize the dispersion, the setting rate of the adhesive improves, even at high solids content. In the polymerization, at least part of the low molecular mass polyvinyl alcohol is included in the initial charge, and all of the emulsifier fraction is included in the initial charge. A disadvantage affecting the product obtained by the process is the much-too-low adhesion between cellulosic substrate and polystyrene or polyester films.

An object of U.S. Pat. No. 3,769,151 was to provide a VAE adhesive featuring improved adhesion to polymer films, more particularly to vinyl polymers. A process is described of seed emulsion polymerization of vinyl acetate, ethylene and up to 1% by weight of unsaturated acids, using a mixture of partially hydrolysed and fully hydrolysed polyvinyl alcohols, with only partially hydrolysed polyvinyl alcohol being used to prepare the seed, and with a blend with polyvinyl alcohol having a higher degree of hydrolysis being used in the seed polymerization. Also described is the possibility of additionally using other additives during the polymerization without substantially affecting the adhesive properties. Examples given of such additives which are said to have no effect on the adhesive and cohesive properties of the VAE dispersions are nonionic, cationic or anionic emulsifiers. Aqueous polymers in accordance with U.S. Pat. No. 3,769,151 possess good cohesion, but the adhesion, especially to polystyrene and polyester, is much too low and thus entirely inadequate.

GB-A 1546275 describes a process for obtaining VAE dispersions which in their pressure-sensitive adhesive utility display a good balance in terms of tack, cohesion and adhesion. As shown by the inventive examples, which use exclusively hydroxyethyl-cellulose as protective colloid, and the comparative examples, achieving good adhesion requires the use of chain transfer agents and a protective colloid fraction of not more than 1% by weight, based on total monomer. GB-A 1546275, moreover, requires intrinsic viscosities of between 0.6 and 1.0 dl/g. The products obtained in this way do possess good adhesion properties, but have the disadvantages of inadequate cohesion and an inadequate setting rate.

SUMMARY OF THE INVENTION

The object on which the invention was based was that of achieving a significant improvement with regard to the disadvantages of customary VAE dispersions in terms of inadequate adhesion of the adhesive film produced therefrom to polymer substrates, and at the same time overcoming the disadvantages of known polymers, which to improve their adhesion require the separate addition of chain transfer agents, with regard to inadequate cohesion, and hence to provide an aqueous VAE dispersion which, as an adhesive, possesses a substantially more carefully weighed balance between adhesive and cohesive properties.

DETAILED DESCRIPTION OF THE INVENTION

The aim was to provide a VAE dispersion whose adhesive film in an adhesively bonded assembly possesses a sufficiently high cohesion and at the same time has a high adhesion for difficult-to-bond substrates, such as polymer films, especially polystyrene films and polyester films. Specifically, the cohesion, measured as thermal stability, ought to be at least 0.2 N/mm$^2$, preferably at least 0.3 N/mm$^2$, and at the same time the following adhesion values ought to result:
(i)>3.5 N/cm, preferably at least 4.1 N/cm peel strength for polyethylene terephthalate film Hostaphan® RN125 (PET film) bonded to cotton at a removal speed of 10 mm/min and/or
(ii) at least 2.0 N/cm, preferably at least 2.5 N/cm peel strength for polyethylene terephthalate film Hostaphan® RN125 (PET film) bonded to cotton at a removal speed of 900 mm/min and
(iii) at least 4.2 N/cm, preferably at least 4.5 N/cm, more preferably at least 5.0 N/cm peel strength for polystyrene film Sidaplax® Polyflex 90 bonded to cotton at a removal speed of 5 mm/min.

An object of this invention, moreover, was to provide a process of emulsion polymerization that allows the adhesion of the adhesive film to two different polymer substrates, more particularly to polystyrene and to polyethylene terephthalate, to be increased by at least 20% relative to a product prepared in an otherwise identical manner but in the absence of emulsifiers.

It is an object of the present invention, furthermore, to provide a VAE dispersion which, in addition to the improved adhesion/cohesion balance, ensures a high setting rate of the adhesive film, in other words a tack speed (TS) of at least 2 seconds, preferably at least 1.5 seconds. The VAE dispersion with improved adhesion/cohesion balance and fast setting rate ought, furthermore, to possess good machine travel properties. In the preparation of the VAE dispersion it ought to be possible, in accordance with the stated object, to forego the use of seed latex, chain transfer agents and emulsifiers based on alkylphenol ethoxylates. The VAE dispersion with an improved adhesion/cohesion balance ought, furthermore, to possess a solids content of at least 56% by weight, preferably of at least 58% by weight, a viscosity, measured as Brookfield viscosity Bf20, in the range between about 1000 and about 10 000 mPas, and, furthermore, a low coarse-particle fraction (sieve residue >40 μm) of less than about 500 ppm.

The invention provides a process for preparing vinyl acetate-ethylene copolymers by means of free-radically initiated emulsion polymerization of vinyl acetate and 18% to 34% by weight of ethylene, based on the total weight of the vinyl acetate and ethylene monomers, and, optionally, further comonomers, characterized in that polymerization takes place in the presence of at least one protective colloid and of 0.5% to 4% by weight, based on the total amount of monomers, of at least one nonionic, ethoxylated emulsifier with a branched or linear alkyl radical or in the form of ethylene oxide-propylene oxide copolymers, and in the absence of chain transfer agent, and, before the initiation of the polymerization, 10% to 70% by weight of the vinyl acetate monomer and 40% to 100% by weight of the ethylene monomer are included in the initial charge, up to 100% by weight of the protective colloid fraction is included in the initial charge, at least 25% by weight of the emulsifier fraction is included in the initial charge, and the remaining fractions of monomers, protective colloid and emulsifier are metered in during the polymerization, the procedure being such that the criterion of process COP meets the condition 2.5≤COP≤70, where
COP=100×(ETM$^{2.5}$×ETV$^{1.25}$×EA$^{2.5}$×EV$^{1.5}$×VV$^{-1}$),
where
ETM=MEt/MM, ETV=MEtV/MEt, EA=100 ME/MM, EV=MEV/ME and VV=MVacV/MVac, where MEt=total mass of ethylene in kg, MM=total mass of monomer in kg, MEtV=mass of ethylene charge in kg, ME=total mass of emulsifier in kg, MEV=mass of emulsifier charge in kg; MVacV=mass of vinyl acetate charge in kg, and MVac=total mass of vinyl acetate in kg.

In general the vinyl acetate fraction is 66% to 82% by weight, preferably 68% to 80% by weight, more preferably 68% to 78% by weight, and most preferably 68% to 76% by weight, based in each case on the total weight of the vinyl acetate and ethylene monomers.

The ethylene fraction is preferably 20% to 32% by weight, more preferably 22% to 32% by weight and most preferably 24% to 32% by weight, based in each case on the total weight of the vinyl acetate and ethylene monomers.

For the purpose of extending the profile of properties of the polymer, and if the positive adhesion/cohesion balance properties are not weakened by doing so, but instead, ideally, are improved, it is also optionally possible, besides vinyl acetate and ethylene, to polymerize further comonomers that are copolymerizable with them. Examples of such comonomers are vinyl esters of carboxylic acids having 3 to 18 C atoms. Preferred vinyl esters are vinyl propionate, vinyl butyrate, vinyl 2-ethylhexanoate, vinyl laurate, 1-methyl vinyl acetate, vinyl pivalate, and vinyl esters of α-branched monocarboxylic acids having 9 to 11 C atoms, examples being VeoVa9® or VeoVa10® (trade names of the company Hexion). Other suitable further comonomers are those from the group of the esters of acrylic acid or methacrylic acid with unbranched or branched alcohols having 1 to 15 C atoms. Preferred methacrylic esters or acrylic esters are esters such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate and norbornyl acrylate. Other suitable comonomers include vinyl halides such as vinyl chloride, or olefins such as propylene.

Preferably no N-vinylformamide or N-vinylpyrrolidone is copolymerized. The fraction of such comonomers, based on the total amount of vinyl acetate and ethylene, can be between about 1% and 40% by weight, preferably between about 5% and 25% by weight.

Optionally it is possible for additionally 0.05% to 10% by weight, based on the total amount of vinyl acetate and ethylene, of other monomers (auxiliary monomers) to be copolymerized. Examples of auxiliary monomers are ethylenically unsaturated monocarboxylic and dicarboxylic acids, preferably acrylic acid, methacrylic acid, fumaric acid and maleic acid; ethylenically unsaturated carboxamides and carbonitriles, preferably acrylamide and acrylonitrile; monoesters and diesters of fumaric acid and maleic acid, such as the diethyl and diisopropyl esters, and also maleic anhydride, ethylenically unsaturated sulphonic acids and their salts, preferably vinylsulphonic acid, 2-acrylamido-2-methyl-propanesulphonic acid. Other examples are pre-crosslinking comonomers such as polyethylenically unsaturated comonomers, examples being divinyl adipate, diallyl maleate, allyl methacrylate or triallyl cyanurate, or post-crosslinking comonomers, examples being acrylamidoglycolic acid (AGA), methylacrylamidoglycolic acid methyl ester (MAGME), N-methylolacrylamide (NMA), N-methylolmethacrylamide (NMMA), N-methylolallylcarbamate, alkyl ethers such as the isobutoxy ether or esters of N-methylolacrylamide, of N-methylol-methacrylamide and of N-methylolallylcarbamate. Also suitable are epoxy-functional comonomers such as glycidyl methacrylate and glycidyl acrylate. Other examples are silicon-functional comonomers, such as acryloyloxypropyltri(alkoxy)- and methacryloyloxypropyltri(alkoxy)silanes, vinyltrialkoxysilanes and vinylmethyldialkoxysilanes, alkoxy groups that may be present being, for example, methoxy, ethoxy and ethoxypropylene glycol ether radicals. Mention may also be made of monomers with hydroxyl or CO groups, examples being methacrylic and acrylic hydroxyalkyl esters such as hydroxyethyl, hydroxypropyl or hydroxybutyl acrylate or methacrylate, and also compounds such as diacetoneacrylamide and acetylacetoxyethyl acrylate or methacrylate.

Most preferred are vinyl acetate-ethylene copolymers without further comonomer units or auxiliary monomers.

The average molecular weight of the vinyl acetate-ethylene copolymers is characterized, as is widespread and customary in industrial practice, by means of the Fikentscher K value (H. Fikentscher, Cellulosechemie 13 (1932) 58; cf. also in W. Philippoff: Viskosität der Kolloide, Verlag von Theodor Steinkopff, 1942, p. 172), obtained from viscosity measurements with account taken of DIN 51562. The K value of the vinyl acetate-ethylene copolymers is 75≤K value <125, preferably 75 to 120, more preferably 80 to 115, with particular preference 80 to 110, and more particularly 85 to 105. The Fikentscher K value correlates unequivocally with the intrinsic viscosity [η] of Staudinger (cf., e.g., P. J. Flory, Principles of Polymer Chemistry, Cornell University Press, 1953, p. 308 ff); that figure, accordingly, is in accordance with the invention $1.14 \leq [\eta] < 2.91$ dl/g, preferably $1.14$ dl/g$\leq [\eta] \leq 74$ dl/g, more preferably $1.29$ dl/g$\leq [\eta] \leq 2.53$ dl/g, with particular preference $1.29$ dl/g$\leq [\eta] \leq 2.33$ dl/g, and more particularly $1.44$ dl/g$\leq [\eta] \leq 2.14$ dl/g.

The polymerization takes place in accordance with the emulsion polymerization process, the polymerization temperature being generally 40° C. to 100° C., preferably 50° C. to 90° C. and particularly 60° C. to 80° C. The polymerization pressure is generally between 40 and 100 bar, preferably between 45 and 90 bar, and varies particularly between 45 and 85 bar, depending on the ethylene feed. The polymerization is initiated using the redox initiator combinations that are customary for emulsion polymerization.

Examples of suitable oxidation initiators are the sodium, potassium and ammonium salts of peroxodisulphuric acid, hydrogen peroxide, tert-butyl peroxide, tert-butyl hydro-peroxide, potassium peroxodiphosphate, tert-butyl peroxo-pivalate, cumene hydroperoxide, isopropylbenzene monohydroperoxide, azobisisobutyronitrile. Preference is given to the sodium, potassium and ammonium salts of peroxodi-sulphuric acid and hydrogen peroxide. The stated initiators are used generally in an amount of 0.05% to 2.0% by weight, based on the total weight of the monomers.

Suitable reducing agents are the sulphites and bisulphites of the alkali metals and of ammonium, an example being sodium sulphite, the derivatives of sulphoxylic acid such as zinc or alkali metal formaldehyde-sulphoxylates, an example being sodium formaldehyde-sulphoxylate (Brüggolit®), and (iso)ascorbic acid, and tartaric acid. Preference is given to sodium formaldehyde-sulphoxylate and (iso)ascorbic acid and the salts thereof, such as Na isoascorbate, for example, and to tartaric acid. The amount of reducing agent is preferably 0.05% to 3% by weight, based on the total weight of the monomers.

Preference is given to the redox initiator combination of hydrogen peroxide and Na formaldehyde-sulphoxylate. In this combination, hydrogen peroxide is used generally in an amount of 0.06% to 0.4% by weight, preferably of 0.1% to 0.3% by weight, more preferably 0.15% to 0.25% by weight, based on total monomer. The ratio of oxidizing agent to reducing agent is then generally from 10:70 to 10:3, preferably from 10:60 to 10:6, and very preferably from 10:60 to 10:10 weight fractions.

Preferred protective colloids are partially hydrolysed or fully hydrolysed polyvinyl alcohols, known as standard polyvinyl alcohols, having an average degree of hydrolysis of 85 to 99.9 mol %.

Preference is given on the one hand to partially hydrolysed standard polyvinyl alcohols or mixtures of such polyvinyl alcohols having an average degree of hydrolysis of 86 to 96 mol %. Particular preference is given to partially hydrolysed polyvinyl alcohols having an average degree of hydrolysis of 86 to 90 mol %, preferably in each case having a mass-average degree of polymerization of 600 to 2000. To adjust the viscosity of the resulting polymer dispersion it may be advantageous to use mixtures of polyvinyl alcohols with different degrees of polymerization, in which case the degrees of polymerization of the individual components may be smaller or greater than the mass-average degree of polymerization, of 600 to 2000, of the mixture.

Preference is also given on the other hand to fully hydrolysed standard polyvinyl alcohols having an average degree of hydrolysis of 96.1 to 99.9 mol %, preferably having an average degree of hydrolysis of 97.5 to 99.5 mol %, alone or in mixtures with partially hydrolysed standard polyvinyl alcohols, the fully hydrolysed polyvinyl alcohols being characterized preferably by a mass-average degree of polymerization of 600 to 3500.

However, it is also possible, alongside such standard polyvinyl alcohols, to use modified polyvinyl alcohols, such as, for example, those which carry functional groups, such as acetoacetyl groups, for example, or those which comprise comonomer units, such as vinyl laurate-modified or Versatic acid vinyl ester-modified polyvinyl alcohols, for example, or—and preferably—ethylene-modified polyvinyl alcohols, which are known, for example, under the trade name EXCEVAL®, alone or in combination with the stated standard polyvinyl alcohols. Preferred ethylene-modified polyvinyl alcohols have an ethylene fraction of up to 12 mol %, preferably 1 to 7 mol % and more preferably 2 to 6 mol %; 2 to 4 mol % in particular. The mass-average degree of polymerization is in each case from 500 to 5000, preferably 2000 to 4500, and more preferably 3000 to 4000. The average degree of hydrolysis is generally greater than 92 mol %, preferably 94.5 to 99.9 mol %, and more preferably 98.1 to 99.5 mol %. Of course, it is also possible, and may be advantageous, to use mixtures of different ethylene-modified polyvinyl alcohols, alone or in combination with partially hydrolysed and/or fully hydrolysed standard polyvinyl alcohols.

Suitable protective colloids are also water-soluble cellulose derivatives, by way of example and preferably hydroxyethyl-cellulose, having viscosities in 2% strength by weight aqueous solutions of ≤6500 mPas, preferably of ≤3500 mPas, more preferably of ≤1500 mPas and in particular of ≤500 mPas. Suitable protective colloids, furthermore, are polyvinyl-pyrrolidones having K values of between 10 and 30. It may also be advantageous to use mixtures of the stated polyvinyl alcohols with water-soluble cellulose derivatives and/or polyvinylpyrrolidones, or mixtures of water-soluble cellulose derivatives and polyvinylpyrrolidones. Water-soluble means that their solubility in water under standard conditions is >1 g/100 ml water.

The protective colloids are added in the polymerization generally in an amount totalling 1% to 4% by weight, preferably 1.5% to 3.5% by weight, more preferably 2% to 3.5% by weight, based in each case on the total weight of the monomers.

Surprisingly it has been found that the selection of the type and amount of the emulsifiers used during the polymerization reaction very decisively controls the adhesion/cohesion balance of the vinyl acetate-ethylene copolymers. Polymers which differ only in the nature and proportion of the emulsifiers can have higher or lower values for adhesion to different polymer substrates in comparison to emulsifier-free polymers prepared in the same way. An improvement in adhesion of at least 20% on at least two different polymer substrates, such as on polyethylene terephthalate film and on polystyrene film, for example, is possible only with specific emulsifiers or emulsifier mixtures. Alkylphenol ethoxylates ought to be excluded on account of the known environmental and health problems.

Suitable emulsifiers are nonionic, ethoxylated emulsifiers with a branched or linear alkyl radical or in the form of ethylene oxide-propylene oxide copolymers. Preference is given to ethoxylated fatty alcohols, including oxo-process alcohols, with a branched or linear alkyl radical, the alkyl radical having 4 to 40 C atoms, preferably 8 to 18 C atoms, and being ethoxylated with 2 to 60, preferably 4 to 40, ethylene oxide units. Examples thereof are $C_{12}$ to $C_{14}$ fatty alcohols having 3 to 40 ethylene oxide units, $C_{13}$ to $C_{15}$ fatty alcohols (oxo-process alcohols) having 3 to 40 ethylene oxide units, $C_{16}$ to $C_{18}$ fatty alcohols having 11 to 60 ethylene oxide units, $C_{10}$ or $C_{13}$ fatty alcohols (oxo-process alcohols) having 3 to 40 ethylene oxide units, polyoxyethylenesorbitan monooleate having 20 ethylene oxide units. Particularly preferred ethoxylated fatty alcohols in this context are the polyethylene oxide ethers having 2 to 60 ethylene oxide units of linear alcohols (such as oleyl alcohol, stearyl alcohol) or isotridecyl alcohol. Other preferred nonionic, ethoxylated emulsifiers are copolymers of ethylene oxide (EO) and propylene oxide (PO) with an ethylene oxide fraction of 10% to 40% by weight and a molar mass of 1500 to 3000. Particularly preferred are EO—PO copolymers with an EO fraction of 10% to 30% by weight. Advantageously it is also possible to use mixtures of the stated emulsifiers.

Where only one individual emulsifier is used, preference is given to nonionic isotridecyl ethoxylates having 2 to 60 EO units, more preferably having 4 to 40 EO units, and most preferably having 4 to 35 EO units. Also preferred are nonionic ethoxylated fatty alcohols having 4 to 40 EO units, and copolymers of ethylene oxide (EO) and propylene oxide (PO) with an ethylene oxide fraction of 10% to 30% by weight and a molar mass of 1500 to 3000.

Where mixtures of emulsifiers are employed, preferred mixtures are those of two nonionic ethoxylated isotridecyl alcohols, with one component containing 4 to 18 EO units and the second component having 12 to 40 EO units.

Also preferred are mixtures of a nonionic ethoxylated isotri-decyl alcohol having 2 to 60 EO units and an ethoxylated, linear nonionic emulsifier. Examples of miscible, linear nonionic emulsifiers are linear fatty alcohols having 4 to 40 EO units, and copolymers of ethylene oxide (EO) and propylene oxide (PO) with an ethylene oxide fraction of 10% to 40% by weight.

Also preferred are mixtures of one or more nonionic ethoxylated isotridecyl alcohols having 2 to 60 EO units and anionic, preferably ethoxylated anionic emulsifiers. Examples of miscible ethoxylated anionic emulsifiers are linear alkyl ether sulphates based on linear fatty alcohols having 4 to 40 C atoms and 4 to 40 EO units or monoesters of sulphosuccinic acid with linear fatty alcohols having 4 to 40 C atoms and 4 to 40 EO units. The fraction of anionic, preferably ethoxylated anionic, emulsifiers in the mixture is not more than 50% by weight, preferably not more than 30% by weight, and more preferably not more than 20% by weight, based on the total weight of the emulsifier mixture.

For the polymerization, the emulsifier is added generally in an amount totalling 0.5% to 4% by weight, preferably 0.8% to 3% by weight, more preferably 1.0% to 2.5% by weight, and most preferably 1.2% to 2.2% by weight, based in each case on the total weight of the monomers.

For the polymerization, prior to its initiation, 10% to 70% by weight of the vinyl acetate fraction, preferably 10% to 50% by weight, more preferably 15% to 50% by weight and most preferably 22% to 42% by weight is included in the initial charge to the reactor.

Of the ethylene fraction, 40% to 100% by weight, preferably 50% to 100% by weight and more particularly 50% to 75% by weight is included in the initial charge to the reactor, prior to initiation.

Where, other than vinyl acetate and ethylene, further comonomers or else auxiliary monomers are used, it is possible for these to be included in their entirety in the initial charge to the reactor, prior to initiation, or to be metered in in their entirety during the reaction. Such comonomers or auxiliary monomers may also be part included in the initial charge and part metered in.

Up to 100% by weight of the protective colloids are included in the initial charge to the reactor before the polymerization is initiated; preferably at least 20% by weight, more preferably at least 50% by weight, of the protective colloids are included in the initial charge, and most preferably 100% by weight of the protective colloids are included in the initial charge.

The emulsifier fraction is included in the initial charge to the reactor, before the polymerization is initiated, at 25% to 100% by weight, preferably at least 40% by weight, more preferably at 55% to 85% by weight and most preferably at 62% to 82% by weight, based in each case on the weight of the emulsifier employed in total.

It is preferred for all of the initiator to be metered in. When a redox initiator combination is used, it is preferred to include at least some of one of the two components in the initial charge, and with particular preference at least some of the reducing agent component is included in the initial charge.

Surprisingly it emerged that, as well as the selection of the nature and amount of the emulsifier component(s) and the distribution thereof between initial reactor charge and feed, the distribution of the two monomer components, vinyl acetate and ethylene, between initial reactor charge and feed was also of considerable influence on the adhesion/cohesion balance. Without tying ourselves to theoretical aspects of vinyl acetate-ethylene copolymerization in emulsion, we interpret this ultimately as the influence of a copolymer composition which changes in time over the course of the polymerization reaction and which is controlled by the distribution of the vinyl acetate and ethylene monomers between initial reactor charge and feeds, and regulates the adhesion/cohesion balance of the polymer:

for typical, widespread, emulsion polymers of vinyl acetate and ethylene prepared in the presence of protective colloid, especially in the presence of polyvinyl alcohol, and in the absence of emulsifier, it is known that the lower the ethylene content of the copolymer for low monomer conversion rates, the greater the adhesion, and vice versa. For such polymers, in contrast, it is disadvantageous for the adhesion that the ethylene fraction in the copolymer decreases from higher values for low conversion rates, with increasing monomer conversion, to the final value, which is determined by the total ethylene fraction in the copolymer. The former is achieved, as is known, for polymerization in the absence of emulsifiers, by making the fraction of ethylene in the reactor before the reaction is initiated relatively low, and making the vinyl acetate fraction in the reactor before the reaction is initiated relatively high.

It was, therefore, completely surprising to find that, in the case of polymerization in the presence of emulsifiers employed in accordance with the invention, an increasing ethylene content of the copolymer for low monomer conversion rates was accompanied by a distinct increase—and not, for instance, a decrease—in the adhesion, and vice versa. For the desired adhesion/cohesion balance it is particularly advantageous if the ethylene fraction in the copolymer is relatively uniform over the course of the polymerization, or if the ethylene fraction in the copolymer decreases from a relatively high value for low conversions, with increasing monomer conversion, to a final value which is determined by the total fraction of ethylene, based on the total amount of the monomers. In contrast, the greater the extent to which the ethylene fraction in the copolymer increases from low values for low conversion rates, with increasing monomer conversion, to the final value, the more disadvantageous it is for the adhesion. The former is achieved, in the case of polymerization in the presence of emulsifiers employed in accordance with the invention, by making the ethylene fraction in the reactor before the reaction is initiated relatively high, and making the vinyl acetate fraction in the reactor before the reaction is initiated relatively low. If, however, for example, the selected fraction of ethylene charge is 100% by weight and at the same time the selected fraction of vinyl acetate charge is less than about 10% by weight, it is not only possible for this to lead to problems concerning inadmissibly high initial pressure values in the reactor, but also the required adhesion/cohesion balance is then no longer ensured, because the cohesion drops too sharply.

As illustrated by the description of the invention so far, the adhesion/cohesion balance can be adjusted, surprisingly, by a number of parameters. These are essentially the ethylene fraction based on total monomer, ETM; the fraction of ethylene charge based on total ethylene, ETV; the fraction of emulsifier based on total monomer, EA; the fraction of emulsifier charge based on total emulsifier, EV; and the fraction of vinyl acetate charge based on total vinyl acetate, VV; the nature of the emulsifier is defined in accordance with the invention. The fractions here are in each case weight fractions.

The required adhesion/cohesion balance is ensured by selecting the combination of these parameters within the mandated limiting ranges in such a way that, generally, the following criterion of process COP is fulfilled:

$2.5 \leq COP \leq 70$, where $COP = 100 \times (ETM^{2.5} \times ETV^{1.25} \times EA^{2.5} \times EV^{1.5} \times VV^{-1})$ The parameters here are defined as follows:
ETM=MEt/MM; ETV=MEtV/MEt; EA=100 ME/MM; EV=MEV/ME and VV=MVacV/MVac.

The individual variables have the following definitions: MEt: total mass of ethylene in kg; MM: total mass of monomer in kg; MEtV: mass of ethylene charge in kg; ME: total mass of emulsifier in kg; MEV: mass of emulsifier charge in kg; MVacV: mass of vinyl acetate charge in kg; and MVac: total mass of vinyl acetate in kg. The equation given defines the COP value only when all of the parameters are located within the specified limiting values, and the emulsifier component is selected in accordance with the invention.

The required adhesion/cohesion balance is ensured more particularly by the criterion of process being selected to be advantageously $3.0 \leq COP \leq 65$, preferably $3.0 \leq COP \leq 60$, more preferably $3.5 \leq COP \leq 55$.

The bottom and top values for the criterion, LL (lower limit) and UL (upper limit), may vary within the stated limits depending on the emulsifier or emulsifier mixture used and depending on the nature and fraction of protective colloid. The LL values stated are rounded to an accuracy of one decimal place; the UL values stated are rounded to an accuracy of whole numbers. At values below the LL, the adhesion requirements cannot generally be ensured. At values above the UL, the cohesion requirements cannot generally be ensured.

In the conduct of the emulsion polymerization, the general procedure is to introduce the stated constituents of the reaction mixture (monomers, protective colloid, emulsifier), in the stated proportions, as an initial charge and to heat the batch subsequently to polymerization temperature. On a relatively large scale, advantageously, the initial reactor charge is heated, prior to the commencement of initiation, to a temperature which is between 10° C. and 40° C. below the desired polymerization temperature, and the exothermic heat of reaction is utilized for heating the reactor to reaction temperature. When the polymerization temperature has been reached, the initiator or, in the case of a redox initiator combination, oxidizing agent and reducing agent are metered in, and the uniform metered addition of the remainders of monomer, emulsifier and, where appropriate, protective colloid is commenced following the exothermic onset of the polymerization.

The pH during the polymerization reaction is about 2 to 7, preferably about 3 to 6 and more preferably about 3.5 to 5.5. For this it may be necessary to adjust the pH of the initial reactor charge, before the start of initiation, to levels of less than 6, preferably less than 5 and more preferably in the range between 3 and 4. Suitability for pH adjustment is possessed by known organic or inorganic acids, of which phosphoric acid and formic acid are particularly preferred. It is also possible to supply customary buffer substances to the initial reactor charge prior to initiation, or to meter them in during the reaction, though preferably such buffer substances can be omitted.

In one preferred embodiment the procedure adopted is that 22% to 32% by weight of ethylene, based on total vinyl acetate and ethylene monomer (in the absence of further comonomers), 1.5% to 3.5% by weight, based on total monomer, of protective colloids, more particularly of partially hydrolysed standard polyvinyl alcohol(s) having a mass-average degree of polymerization of 600 to 2000 and an average degree of hydrolysis of 86 to 96 mol %, or of fully hydrolysed standard polyvinyl alcohols having a mass-average degree of polymerization of 600 to 3500 and an average degree of hydrolysis of 96.1 to 99.9 mol %, or of modified polyvinyl alcohols, more particularly of ethylene-modified polyvinyl alcohols, having a mass-average degree of polymerization of 500 to 4500 and an average degree of hydrolysis of 94.5 to 99.9, or hydroxyethylcellulose with viscosities, in 2% strength by weight aqueous solution, of ≤1500 mPas, or mixtures of the stated protective colloids, and 1% to 2.5% by weight, based on total monomer, of nonionic ethoxylated emulsifier(s) having 4 to 40 EO units and a linear or branched alkyl chain with between 8 and 18 C atoms are used, and 15% to 50% by weight of the vinyl acetate fraction, 50% to 75% by weight of the ethylene fraction, 100% by weight of the protective colloid fraction, 50% to 85% by weight of the emulsifier fraction and a portion of the reducing agent component are introduced as an initial charge to the reactor prior to initiation, the initial reactor charge is adjusted to a pH between 3 and 4, and this pH-adjusted charge is heated to a starting temperature of 10° C. to 40° C. below the reaction temperature. The reaction can be subsequently initiated by parallel metering of hydrogen peroxide oxidizing agent and Na formaldehyde-sulphoxylate reducing agent, and continued a short time after exothermic reaction initiation with uniform parallel metering of vinyl acetate, ethylene, aqueous emulsifier solution and continuing redox initiator feeds. The ethylene feed and the emulsifier feed may end together with the vinyl acetate feed; preferably the ethylene feed and the emulsifier feed are ended before the end of the vinyl acetate feed. More particularly it is advantageous to end the emulsifier feed at a fraction of just 50% to 75% by weight of the metered vinyl acetate fraction. After the end of the vinyl acetate feed, the redox initiator feeds continue, optionally at increased rates, until the exothermic reaction subsides and/or the amount of unreacted vinyl acetate has dropped to less than 2% by weight, preferably to less than 1% by weight, based on the total amount, in terms of aqueous dispersion. Subsequently, in the reactor, during the transfer of the reactor contents to a downstream vessel, or in that downstream vessel, the fraction of unreacted monomer is reduced to at least less than 0.1% by weight, based on aqueous dispersion, by means of post-polymerization, with addition of further redox initiator components, and/or by means of conventional steam stripping.

The average molar mass of the copolymer of vinyl acetate and ethylene is characterized here by the K value and/or the intrinsic viscosity [η]. General correlations between intrinsic viscosity and an average molar mass are described in, for example, H.-G. Elias, Polymere, Von Monomeren and Makromolekülen zu Werkstoffen, Hüthig & Wepf Verlag, 1996, p. 197 ff. As is known, the molar mass decreases as the ethylene content of a vinyl acetate-ethylene copolymer goes up. Here it has now been found that the molar mass, characterized by K value or intrinsic viscosity, is dependent, in a surprisingly considerable way, under otherwise constant conditions, on the nature and amount of the emulsion fraction as well as on its distribution between initial reactor charge and feed, and also on the distribution of the two monomers, vinyl acetate and ethylene, between initial reactor charge and feed, and so these parameters, within the limits specified, may be selected such that, for a fraction of ethylene as a proportion of total monomer of between 18% and 34% by weight, it is possible to achieve K values of 75≤K value<125, and this then contributes to ensuring the required, significantly improved adhesion values on difficult-to-bond substrates, more particularly for polystyrene films and polyethylene terephthalate films, in tandem with sufficient, effective cohesion of the film of adhesive, i.e. the significantly improved adhesion/cohesion balance.

As is known, emulsifier fractions in aqueous vinyl acetate-ethylene copolymer dispersions comprising polyvinyl alcohol may positively influence the adhesion without an attendant change in K value or intrinsic viscosity (compare EP 1212383 B1). With the process of the invention, success has now been achieved in increasing the adhesion values, measured in force/length units, e.g. N/cm, for a defined removal speed in length per unit time, e.g. in mm/min, with sufficiently good cohesion, determined as thermal stability in $N/mm^2$, on at least two different, arbitrary polymer substrates, especially polystyrene and polyethylene terephthalate, by in each case at least 20% and in some cases significantly above that, as compared with polymers polymerized under otherwise identical conditions in the absence of emulsifiers.

Relative to existing aqueous vinyl acetate-ethylene copolymer dispersions (VAE dispersions), the products obtained with the process of the invention exhibit a considerably improved adhesion in the bonding of polymeric films to cellulosic substrates such as paper, cardboard or cotton fabric. As compared with existing adhesives based on VAE dispersions, the balance between adhesion and cohesion is retained.

Success has thus been achieved in providing aqueous VAE dispersions which have a cohesion value, measured as thermal stability, of at least $0.2 N/mm^2$, in particular of at least $0.3 N/mm^2$, and at the same time exhibit high adhesion values in the context of difficult-to-bond substrates:
an adhesion of >3.5 N/cm peel strength for polyethylene terephthalate film Hostaphan® RN125 bonded to cotton at a removal speed of 10 mm/min;
an adhesion of at least 2.0 N/cm at a removal speed of 900 mm/min;
an adhesion of at least 4.2 N/cm for polystyrene film Sidaplax® Polyflex 90 bonded to cotton at a removal speed of 5 mm/min.

Furthermore, the aqueous VAE dispersions display a high setting rate of the adhesive film, which—measured as the tack speed (TS)—attains values of at least 2 seconds, preferably of at least 1.5 seconds.

The aqueous dispersions obtainable by the process of the invention have a solids content of generally ≥56%, preferably ≥58%. The viscosity of the aqueous dispersions is generally between 1000 and 10 000 mPas, measured as Brookfield viscosity Bf20, for solids content in the range from 56% to 62%. Fine-particle dispersions are obtained with a very low fraction of coarse particles: the sieve residue >40 μm is less than 500 ppm.

The VAE dispersions obtained by the process of the invention are suitable for use as or in adhesives for the bonding of a variety of substrates, preferably of paper, cardboard, wood, fibre materials and plastics such as polymer films, examples being polyethylene, polyvinyl chloride, polyamide, polyester and polystyrene films or acrylonitrile-butadiene-styrene substrates. The VAE dispersions find use more particularly as paper adhesives, packaging adhesives, wood adhesives and adhesives for woven and non-woven fibre materials. The VAE dispersions are particularly suitable for the bonding of cellulosic substrates, more particularly paper, cardboard or cotton fabric, in each case to plastics, more particularly to polymeric films, or for the bonding of plastics to one another, such as for film/film bonds, for example.

The examples which follow serve to illustrate the invention without confining it to the examples given.

Described first of all are the test methods for characteristic dispersion values, and the test methods for determining the adhesive properties:

Test Methods for Characteristic Dispersion Values:
Solids Content/Drying Residue (SC)

To determine the solids content, in percent based on dispersion, about 0.3 g of polymer dispersion was weighed out and dried as a thin film for 30 minutes at 150° C. in an air-circulation drying cabinet. The drying residue was weighed again, following cooling in a desiccator over silica gel, and the solids content in % by weight, based on dispersion, was calculated from residue and initial mass.

Viscosity (Bf20)

The viscosity of the dispersion was measured, following conditioning at 23° C., using a Brookfield viscometer and using spindle 5 at 20 rpm. The viscosity is reported in mPas. For greater ease of comparability, the viscosity values measured at the experimental solids content, $SC_{EX}$, i.e. $Bf20_{EX}$, have been converted for a solids content of 60%; with satisfactory approximation, the relationship for the polymer dispersions under investigation here is as follows:

$$Bf20(60\%) = Bf20_{EX} * EXP(0.5*(60-SC_{EX})).$$

Particle Sizes ($x_{3,50}$)

To determine a particle size distribution with the Beckmann Coulter® LS 13 320 instrument in accordance with the instrument instructions, using the optical constants for polyvinyl acetate, the dispersion was diluted with water. The particle size reported here is the central value of the volume distribution function of the particle diameter, $x_{3,50}$, in nanometers. The particle size distributions determined exhibit substantially monomodal distribution densities, whose modal value is close to the central value of the distribution.

Sieve Residue (Grit)

The residue of the dispersion, reported in parts per $10^6$, based on dispersion (ppm), characterizes coarsely granular fractions in the dispersion with dimensions greater than 40 μm. In order to determine fractions of this kind, which are unwanted and must be minimized, 100 grams of the dispersion were diluted with up to one liter of distilled water, and then poured through a nylon sieve fabric having a mesh size of 150 μm, and the undersize was filtered through a sieve fabric with a mesh size of 40 μm. Rinsing with water was continued in each case until the undersize was clear. The residue on the sieve fabrics was dried and weighed, and a calculation was made of the sieve residue per sieve fabric, based on dispersion. Table 3 reports the total residue greater than 40 μm on both sieves.

It should be expressly mentioned that the reporting of residue >40 μm is a very critical evaluation of the sieve residue. Customary within industry are data >50 μm or >60 μm. In accordance with experience, in the range between 40 μm and 60 μm, about 20% to 50% of the residue may be between 40 μm and 150 μm.

K Value and Intrinsic Viscosity

The dispersion was weighed out into a 50 ml volumetric flask to produce a dispersion sample which contained 0.5 g of polymer (without polyvinyl alcohol) and 4 g of water. Tetrahydrofuran (THF) was added slowly dropwise, with stirring, until a clear solution was produced. Following conditioning at 23° C., the flask was made up to the mark with THF. The measurement solution had a concentration of 1 g of polymer per 100 ml of solution. Taking account of the Hagenbach correction, the viscosity of a gel-free sample of the measurement solution and of the polymer-free comparative solution was determined in an Ubbelohde viscometer (capillary 1c) at 23° C. to find the relative solution viscosity $\eta_{rel}$. Using this figure, the "inherent viscosity k" of Fikentscher, Cellulosechemie 13 (1932) 58, and the "K value", at K=1000 k, were calculated. The inherent viscosity k is given by:

$$k = \frac{1}{2}\left(\frac{1.5 c_V \log \eta_{rel} - c_V}{1.5 c_V^2 + 75 c_V}\right) + \left[\left(\frac{1}{2}\left(\frac{1.5 c_V \log \eta_{rel} - c_V}{1.5 c_V^2 + 75 c_V}\right)\right)^2 + \frac{\log \eta_{rel}}{1.5 c_V^2 + 75 c_V}\right]^{1/2},$$

using the concentration $c_v$ in g/dl.

The K value is a customary and useful parameter which correlates with the viscometric average molar mass of the polymer.

The K value is of course dependent on the copolymer composition and decreases as the ethylene content of a vinyl acetate-ethylene copolymer goes up.

The K value thus determined can be used, with the specified equation, to calculate the concentration dependency of the relative viscosity. From this, by calculation, the dependency of the quotient $(\eta_s/c_v)$, made of up of specific viscosity, $\eta_s = (\eta_{rel} - 1)$, and concentration, $c_v$, follows from the concentration. Extrapolation—advantageously by means of exponential function—to infinite dilution gives the intrinsic viscosity $[\eta]$. The concentration here is used in grams per 100 ml of solution, in other words in g/dl, i.e. $[\eta]$ here is given in dl/g.

The results for K value and intrinsic viscosity $[\eta]$ are reported in Table 3.

Test methods for determining the adhesive properties:
Setting Rate (TS Method)

During the setting of a dispersion which is suitable for use as an adhesive, the strength of the bond increases over time. The rate of the setting process can therefore be described by a change in the strength of the adhesive film as a function of time. Using the method of the tack speed (TS), a determination is now made of the time during which a bond area of 1 cm² withstands an acceleration-free perpendicular tensile force of 2 newtons.

For the adhesive bond, standard cardboard was coated with a 50 μm dispersion film and bonded to a circular section of the same cardboard, measuring 1 cm². After different times, the resistance of the bond to the perpendicular tensile force of 2N was tested, and in this way a determination was made of the time in seconds during which the bond retains its integrity. The result is reported as the TS in seconds. Falling TS values for different dispersions, accordingly, characterize increasing setting rates.

Cohesion 12 plywood blocks (135×30×4 mm) were used to produce 6 test specimens each with a bonded area of 9 cm². To produce the bonds, pairs of blocks were each given a layer of dispersion of 100 μm over a length of 30 mm and joined without pressure for 1 minute. Thereafter the bond was pressed with a pressure of 0.2 N/mm² for 30 minutes. The test specimens were then stored at 23° C. and 50% atmospheric humidity for 7 days and prior to testing were conditioned in an air-circulating drying cabinet at 70° C. for 4 hours. The strength of the bond was then determined immediately in the hot condition with a tensile testing machine at a removal speed of 50 mm/min until the bond fractured. The maximum force at fracture, based on the area of the bond, is reported as the bonding strength (cohesion) in N/mm². The result for the cohesion that is specified is the average value of the tests on all 12 test specimens, rounded to an accuracy of one decimal place. Cohesion values of at least 0.2 N/mm² are required, preferably of at least 0.3 N/mm².

Cumulative Adhesion

Paper strips (10×50 mm) were each coated with a 50 μm film of the dispersion under test, and were adhered to 7 different polymeric films. After a drying time of 2 hours, the test strips were peeled off by hand and the adhesive strength (adhesion) was assessed as follows:

1: very good adhesion, 100% paper tear
2: good adhesion, predominantly paper tear
3: adhesion, separation with resistance
4: no adhesion, delamination The 7 assessment values were added to give the cumulative adhesion, which can therefore vary between 7 (very good adhesion on all 7 substrates) and 28 (no adhesion to any substrate). The cumulative adhesion is to be ≤18, preferably ≤16.

Adhesion (Peel Strength)

For a quantitative determination of the adhesion, a Sidaplax® Polyflex 90 film was used as a polystyrene substrate and a Hostaphan® RN125 film as a polyethylene terephthalate substrate.

A bonded assembly was produced with a standard cotton fabric, characterized by the WFK code 10A in accordance with DIN 53939.

To do this, both the cotton fabric and the film were coated with the aqueous dispersion using a 100 μm wire applicator.

The two coated substrates were then laminated manually and compressed with the aid of a rubber-coated metal roller (3.5 kg). After bonding had taken place, the test specimens were each dried for 24 h under standard conditions (23° C. and 50% relative humidity).

To produce the adhesively bonded assembly of polyethylene terephthalate to cotton, DIN A4-sized areas of the cotton fabric were each bonded to Hostaphan® film (with 5 cm remaining unbonded on one transverse side), and then, after drying, strips with a width of 2.5 cm were cut longitudinally as test specimens, using a cutting machine.

To produce the adhesively bonded assembly of polystyrene to cotton, ready-cut strips of the cotton fabric 2.5 cm wide were bonded centrally to strips of the Sidaplax® film 4.8 cm wide, over a length of 15 cm (with 5 cm remaining unbonded).

To test the adhesion (peel strength), the cotton fabric was delaminated from the film in a tensile testing instrument. This was done by clamping the unbonded sections of the strips and peeling the cotton fabric from the polymer film at a peel angle of approximately 180 degrees. The peel tests were carried out on the day after drying of the adhesively bonded assembly.

To determine the adhesion to polystyrene, a removal speed of 5 mm/min was selected. Over a measurement path of 60 mm, the delamination force (tear propagation resistance) between 20 and 60 mm was measured and averaged.

To determine the adhesion to polyethylene terephthalate, two different measuring speeds were selected: a high removal speed, at 900 mm/min, and a low removal speed, of 10 mm/min. For the low removal speed, a 60 mm measurement path was set up, and the tear propagation resistance between 20 and 60 mm was measured and averaged. At the higher measurement speed of 900 mm/min, a measurement path of 150 mm was set up, and the tear propagation resistance between 20 and 150 mm was measured and averaged. For each substrate and removal speed, 8 bonds were delaminated.

The high removal speed for PET film of 900 mm/min was additionally selected on account of the fact that, at a high removal speed, weaknesses in respect of adhesion are evident with particular clarity.

The adhesion (peel strength) is a product of the averaged tear propagation resistances for all the strips and of the strip width of 2.5 cm in each case, and is reported in N/cm rounded to an accuracy of one decimal place.

EXAMPLES

Comparative Examples 1 and 2

For comparative examples 1 to 2, two commercially available vinyl acetate-ethylene copolymer dispersions were tested which are widely acknowledged to have good adhesion properties. The results are reported in Table 4.

Comparative Example 1

Mowilith® DM132 is a polyvinyl alcohol-stabilized vinyl acetate-ethylene copolymer dispersion from Celanese Corp.

Comparative Example 2

Vinnapas® A920 is a polyvinyl alcohol- and APEO emulsifier-stabilized vinyl acetate-ethylene copolymer dispersion from Wacker Chemie AG.

Examples 3 to 61

Examples 3 and 4 are comparative examples, and were polymerized without using emulsifiers.

The emulsifiers used in Examples 5 to 61 are specified in Table 1 with regard to their trade name and chemical composition.

The polymer dispersions were prepared using the following general polymerization procedure. Table 2 contains the details concerning the variations to this process for the individual examples. Table 2 also specifies the criterion of process (COP) figures for all inventive examples. For the comparative examples COP is not defined, since those examples either do not contain emulsifier or involve a non-inventive emulsifier selection, or else have at least one process parameter which is outside of the range dictated in accordance with the invention.

General Polymerization Procedure for Examples 3 to 61:

The polymerization was carried out in a 2 liter pressure reactor which was equipped with a three-stage paddle stirrer, jacket heating and jacket cooling, connected to a regulable thermostat, and metering ports for the following feeds: feed 1 was an aqueous solution of the oxidizing agent of the redox initiator system, feed 2 was the aqueous solution of the reducing agent of the redox initiator system, feed 3 was the vinyl acetate monomer, feed 4 was the aqueous solution of the emulsifier (only water for the emulsifier-free comparative examples) and feed 5 was the ethylene monomer.

For the course of the polymerization, the following process steps were maintained:

Provision of Initial Reactor Charge:

First of all the aqueous initial charge was prepared, consisting of
  initial charge water,
  aqueous protective colloid solution, prepared separately in accordance with generally recognized methods,
  emulsifiers (where introduced in the initial charge),
  5% by weight of the reducing agent used in feed 2 (unless indicated otherwise).

The pH of the aqueous initial charge was monitored and adjusted to a level of 3.5 generally by addition of phosphoric acid or formic acid (formula amount 10 g).

Thereafter 0.4% by weight of a 1% strength by weight iron ammonium sulphate solution, based on the total monomer amount, was added to the initial charge, and this aqueous initial charge was drawn under suction into the evacuated reactor, followed by 30 g of water to rinse the line.

Then, with stirring, the vinyl acetate was drawn under suction into the initial charge in the reactor, followed by 40 g of water to rinse the line.

The reactor was then heated to the setpoint temperature and at the same time the vacuum was broken with ethylene, and, with the stirrer at the setpoint speed, the initial charge quantity of ethylene was injected.

Start of Reaction and Metering Phase:

With the temperature and pressure at equilibrium, the parallel metering of the two initiator components, in the form of feeds 1 and 2, was commenced.

5 minutes after the onset of the reaction, apparent from an increase in the internal temperature or drop in the jacket temperature, the two feeds 3 and 4 were commenced and were metered in generally at a constant rate over a time of 120 to 180 minutes. Feed 4, with a total amount of 80 g, or with an amount of 100 g for the emulsifier-free comparative polymerizations only, was ended no later than at the same time as feed 3.

15 minutes after the beginning of feeds 3 and 4, feed 5 was commenced, and was ended about 15 minutes before the end of feed 3. The required amount of ethylene was injected in equidistant time intervals with equidistant amounts, generally at intervals of 10 minutes. Feed 5 can of course also be metered in with a constant mass flow rate.

Complete Polymerization:

After the end of feed 3, the rates of feeds 1 and 2, which to that point had generally been constant, were increased, with metering continuing for at least 90 minutes more. The total amounts of feeds 1 and 2 according to the formula were in each case 100 g, or 65 g for each of the emulsifier-free comparative polymerizations. In cases where perceptible reaction was still present after the intended time had expired, both feeds 1 and 2 were continued, each at constant rates, until reaction was no longer perceptible.

Principally on account of a longer metering time and hence a higher metering quantity for feeds 1 and 2, the final solids content of the dispersion may be less than the formula solids content; moreover, deviations between the guideline amounts and the actual amounts for pH adjustments can lead to slight deviations between experimental final solids content and formula solids content.

Post-Polymerization:

After the end of feeds 1 and 2, for the purpose of post-polymerization, 10% strength by weight solutions of Na formaldehyde-sulphoxylate (feed 6) and of tert-butyl hydroperoxide (feed 7), in alternation and with a total of 4 g each, were metered into the reactor with water flushes totalling 20 g.

Cooling/Letdown/Adjustment:

After the end of the post-polymerization, the product was cooled to about 30° C. and the contents of the reactor were let down. With addition of 10% strength by weight aqueous sodium hydroxide solution (formula amount 5 g), the pH was adjusted to about 5.5.

Further Details:

In general, feed 1 used was a 2% strength by weight hydrogen peroxide solution, and feed 2 was (unless indicated otherwise) a 9% strength by weight Na formaldehyde-sulphoxylate solution) (Brüggolit®).

The amount of initial charge water was a product of the concentration of the protective colloid solution used, the formula solids content, and the fill level of the reactor at the end of the reaction, which was generally set at between 90% and 95% by volume. This also defines the respective total amounts of monomers employed.

The water used to provide the solutions for feeds 1, 2, 4, 6 and 7 was exclusively fully demineralized Wofatit water.

For feed 4, different emulsifiers were employed, and are all listed in Table 1.

The protective colloids used were polyvinyl alcohols or hydroxyethylcellulose. The polyvinyl alcohol used, unless indicated otherwise, was a low molecular mass standard polyvinyl alcohol A having a mass-average degree of polymerization of 850 and an average degree of hydrolysis of 88 mol %. Further polyvinyl alcohols used were a standard polyvinyl alcohol B having a mass-average degree of polymerization of 1450 and an average degree of hydrolysis of 88 mol %, and a standard polyvinyl alcohol C having a mass-average degree of polymerization of 3000 and an average degree of hydrolysis of 88 mol %. Modified polyvinyl alcohol D employed was an ethylene-modified polyvinyl alcohol having an ethylene fraction of 3.2 mol %, a mass-average degree of polymerization of 3400 and an average degree of hydrolysis of 98.1 mol %; ethylene fraction and degree of hydrolysis were determined by means of NMR measurements, and the degree of polymerization correlates with the viscosity of a 4% strength by weight solution of this modified polyvinyl alcohol. The hydroxyethylcellulose used was Natrosol® 250 GR from Hercules.

Table 2 summarizes the formula data.

The polymerizations were carried out at temperatures between 50° C. and 70° C. reaction temperature, with the reaction mixture being stirred, to ensure homogeneity of the reaction mixture and heat removal. For this purpose, in the 2 liter reactor, rotary speeds of between 300 and 600 rpm were sufficient. The target rotary speed was unchanged during the reaction. The setpoint temperature at the beginning of feeds 1 and 2 can be lowered to 30° C. to 40° C., and the heat of reaction can be used for the further heating of the reaction mixture. It is found that the temperature profile of the polymerization within the stated range is not of critical influence for the adhesives properties of the products.

Given by way of example is the formula for Example 3 (emulsifier-free comparative example):

Initial Reactor Charge:
292 g of water,
137.5 g of polyvinyl alcohol solution (20% strength by weight) of polyvinyl alcohol A,
6 g of Brüggolit (9% strength by weight solution),
10 g of phosphoric acid (10% strength by weight solution),
guideline value for pH adjustment pH=3.5,
4.5 g of iron ammonium sulphate (1% strength by weight solution),
30 g of water rinse,
400 g of vinyl acetate,
40 g of water rinse,
150 g of ethylene,
heating to setpoint temperature of 60° C.

Feed 1:
65 g of hydrogen peroxide (2% strength by weight aqueous solution)

Feed 2:
65 g of Brüggolit (9% strength by weight aqueous solution)

Feed 3:
400 g of vinyl acetate (metered at constant rate over 2 hours)

Feed 4:
100 g of water (metered at constant rate over 2 hours)

Feed 5:
150 g of ethylene (injected in about 90 minutes)

Feed 6:
4 g of Brüggolit® (10% strength by weight aqueous solution)
10 g of water rinse Feed 7:
4 g of tert-butyl hydroperoxide (10% strength by weight aqueous solution)
10 g of water rinse Adjustment:
5 g of aqueous sodium hydroxide solution (10% strength by weight aqueous solution)

The result according to formula, in the case of complete monomer conversion, was 1883 g, corresponding to 1783 ml, of polymer dispersion, with a formula solids content of 60.4% by weight for a final reactor fill level of approximately 91% by volume.

The procedure for Examples 4 to 61 was analogous, taking account of the details concerning the polymerization process and of the details in Table 2.

Examples 3, 4 and 37 and 57 are comparative examples for polymerizations in the absence of emulsifier, with the fraction of vinyl acetate monomer included in the initial charge, the fraction of polyvinyl alcohol and, for Example 37, the degree of polymerization of the polyvinyl alcohol, through the use of the polyvinyl alcohol B, being varied.

For Example 31, the amount of initial-charge reducing agent was retained, with the concentration of feed 2 reduced to a quarter.

For Example 38, polyvinyl alcohol B was used, and for Example 39a 3:1 blend of polyvinyl alcohol A and polyvinyl alcohol C was used, and for Example 40 polyvinyl alcohol D was used. For Example 41, hydroxyethylcellulose was used as protective colloid.

For comparative examples 59, 60 and 61, chain transfer agent was added additionally: 0.50% by weight of mercaptopropionic acid (MPA) was used, based on total monomer. For comparative examples 59 and 60, MPA was added to the organic feed 3, and for comparative example 61 it was added to the aqueous feed 4. For comparative example 60, furthermore, 1.2% by weight of acrylamide and 0.13% by weight of allyl methacrylate, based in each case on total monomer, were added to feed 4. For comparative example 61, 0.6% by weight of acrylamide and 0.13% by weight of allyl methacrylate, based in each case on total monomer, were added to feed 3.

The resulting polymer dispersions of Examples 3 to 61 were analysed in respect of typical dispersion characteristics. The results of these analyses are reported in Table 3.

The polymer dispersions of Examples 1 to 61 were likewise investigated in respect of their adhesives properties. The results obtained in these investigations are compiled in Table 4.

For comparative example 58 (an emulsifier-free polymer with 3.5% by weight of polyvinyl alcohol A, based on total monomer), 2% by weight of emulsifier, based on polymer, was added to the end product and the adhesives properties were tested (comparative example 58-A).

Discussion of the adhesives properties of the dispersions prepared according to the examples, on the basis of the results compiled in Table 4:

Comparative Examples 1 and 2

The product according to comparative example 1 gave good cohesion and excellent adhesion on polystyrene, but the adhesion values on polyester, particularly at rapid peel, are much too low.

The product according to comparative example 2 gave very good adhesion values particularly to polyester, but the cohesion is much too low.

Comparative Examples 3, 4, 37 and 58

Without Emulsifier

All of the products prepared in emulsifier-free procedures gave excellent cohesion values, of the kind known for prior-art vinyl acetate-ethylene copolymers stabilized exclusively in the presence of polyvinyl alcohol. Polymers prepared under identical conditions (comparative examples 3 and 58) showed lower—and, all in all, inadequate—adhesion values, with increased fraction of polyvinyl alcohol.

An influence of the distribution of vinyl acetate monomer (VAC) between initial charge and feed was manifested here in the form that, with a 25% by weight VAC initial charge, lower adhesion values were obtained than with a 50% by weight VAC initial charge; the K value as well is increased for a 25% by weight VAC initial charge (comparative example 4 in comparison to comparative example 3). As evident from results for inventive examples, still to be discussed below, this finding, to complete surprise, was turned around on polymerization in the presence of emulsifier employed in accordance with the invention.

Comparative examples 3 and 4 delivered the base adhesion values for the following inventive examples.

Examples 5, 6 and 7

For these examples, EO-PO adducts were employed as emulsifiers. Whereas, with an EO fraction of approximately 20% by weight, the adhesion values are significantly improved, the improvement when using an EO-PO adduct with an approximately 40% EO fraction is smaller. The reduction in the VAC initial charge from 50% by weight (Example 5) to 25% by weight (Example 6) resulted, surprisingly, in a marked increase in the adhesion values for virtually no change in cohesion.

Examples 8 to 20

For these examples, nonionic, ethoxylated isotridecyl fatty alcohols with different EO chain lengths were used as emulsifiers. Variations were made of the fraction of ethylene relative to total monomer, the ethylene fraction in the initial charge, the VAC fraction in the initial charge, the fraction of emulsifier relative to total monomer, and the fraction of emulsifier in the initial charge.

Example 9 demonstrates, in comparison to Example 8, that, in the presence of inventively employed emulsifier, the adhesion values surprisingly and significantly increase as the fraction of VAC initial charge goes down (in comparison to the emulsifier-free comparative batches 3 and 4), with a decrease in the K value at the same time.

Comparative example 11 demonstrates, in comparison to Example 10, that the increase in the VAC fraction in the initial charge to a no longer inventive 75% by weight leads to low adhesion values, and the adhesion to polystyrene is in fact somewhat impaired.

Comparative example 13 demonstrates, in comparison to Example 10 and Example 12, with 50% and 70% by weight, respectively, of ethylene in the initial charge, that the reduction in the initial ethylene charge to 30% by weight leads to low adhesion values, with a significant impairment of the adhesion to polystyrene.

Example 14 demonstrates the improvement in the adhesion values for an increased fraction of ethylene as a proportion of the total monomer, of 32% by weight, in general, and especially in comparison to Example 10, without any negative influence on cohesion.

Examples 15 to 17 show the positive influence of increasing emulsifier fractions, based on total monomer, on the adhesion values, again in conjunction with a decreasing K value.

For Examples 17 to 19, the initial ethylene charge was raised from 50% to 100% by weight and at the same time the fraction of emulsifier, relative to total monomer, was reduced. Very good improvements in adhesion were achieved in each case.

Examples 20 to 22 and 15 and 9 demonstrate overall very good adhesion values with only a low level of scatter in cohesion for different EO chain lengths of the nonionic isotridecyl ethoxylates, which were employed under otherwise identical conditions.

Examples 23 to 29 illustrate the inventive use of different nonionic ethoxylated emulsifiers and mixtures thereof, leading to improvements in adhesion of between 62% and 110% on polystyrene and between 54% and 133% on polyethylene terephthalate, with cohesion values of between 0.5 and 0.8 $N/mm^2$ being obtained.

In Examples 30 to 36, mixtures of nonionic isotridecyl ethoxylates were employed.

For Example 31, the concentration of feed 2 was reduced to a quarter in comparison to Example 30, leading to an increase in the K value and to a reduction in the adhesion at a high level.

For Examples 32 and 33, all of the ethylene was included in the initial charge, which led to a distinct improvement in adhesion, or permitted a reduction in the ethylene fraction relative to total monomer in Example 33, without any change in the good adhesion to polystyrene (Example 33 in comparison to Example 30)

In the sequence of Examples 30, 34, 35 and 36, the fraction of VAC initial charge was reduced, under otherwise identical conditions, from 25% by weight down to 12.5% by weight. This led to a decrease in the K value and to an improvement in the overall high cohesion values, with a high, approximately constant level being achieved for the adhesion to polyethylene terephthalate (about 200±15% adhesion improvement, compared with the emulsifier-free product).

For comparative example 37 to Example 39, the mass-average degree of polymerization of the polyvinyl alcohol employed was varied.

The emulsifier-free comparative example 37 serves for comparison with Example 38, for which, in turn, a distinct improvement in adhesion is demonstrated, without any change in the K value in this case. The embodiments of Examples 38 and 39 open up the opportunity for a regulation of viscosity, which may be desired, for the polymer dispersion through variation in the mass-average degree of polymerization of the polyvinyl alcohol, also by means of polyvinyl alcohol mixtures, with the level of adhesion obtained being high overall.

Example 40 illustrates how, even when using modified polyvinyl alcohol, in this case ethylene-modified polyvinyl alcohol, it is possible to obtain very good adhesion properties.

Example 41 demonstrates how, even when using hydroxyethyl-cellulose, it is possible to obtain very high adhesion values in tandem with sufficient cohesion.

For Examples 42 and 43, nonionic ethoxylates of linear, saturated, natural fatty alcohols were employed in accordance with the invention, resulting in the desired improvement in adhesion.

For Examples 44, 47 and 48, and also comparative examples 45 and 46, different emulsifiers and mixtures thereof were employed. Where an anionic, ethoxylated fatty alcohol was used alone, in comparative example 45, the adhesion is inadequate and on polystyrene it even decreases.

For Examples 46 to 48, the fraction of emulsifier charge was raised between zero and 100% by weight, based on the total emulsifier. Comparative example 46 demonstrates that, without an initial emulsifier charge, it is not possible to achieve the necessary improvement in adhesion. The adhesion on polyethylene terephthalate in fact goes down here significantly. In contrast, using an emulsifier mixture comprising nonionic and anionogenic ethoxylated emulsifiers, with a sufficient initial emulsifier charge, as in Examples 47 and 48, it was possible to obtain significant improvements in adhesion.

Examples 49 to 56 are comparative examples for different anionic emulsifiers containing EO groups in some cases. Anionic emulsifiers of this kind, when used alone and not in a blend with nonionic ethoxylated alcohols, lead in individual cases to an improvement in the adhesion to a polymer substrate. At the same time, however, the adhesion to the second polymer substrate is impaired.

Comparative example 55, compared with comparative example 54, shows that this situation is not changed if the initial VAC charge is reduced from 50% to 25% by weight: although there is a percentage increase in adhesion to polyethylene terephthalate by means of this measure, as compared with the emulsifier-free product, no improvement in adhesion at all is achieved on polystyrene. In absolute terms, indeed, the peel strengths for comparative example 55 are in fact lower than for comparative example 54.

Comparative example 57 illustrates that even the use of alkylphenol ethoxylates, which are often still recommended, does not lead to the desired percentage improvement in adhesion on two different polymer substrates to the necessary extent.

Comparative examples 58 and 58-A demonstrate that it is not possible through subsequent addition of emulsifier, following an emulsifier-free polymerization, to improve the adhesion of the film of adhesive to polystyrene or to polyethylene terephthalate. The improvement in cumulative adhesion by one point that is indicated derives from a better evaluation of adhesion on a plasticized PVC substrate.

Comparative examples 59 to 61 tested the use of chain transfer agents during the polymerization, and also, for comparative examples 60 and 61, tested the additional use of monomers having a crosslinking activity. As shown by comparative example 59, the use of chain transfer agents leads to an exceedingly marked increase in the peel strengths, but at the same time the cohesion is lost almost completely. Simultaneous use of crosslinking comonomers leads to a certain, though inadequate, increase in cohesion, with the adhesion values dropping significantly. Where the chain transfer agent here is introduced, as in comparative example 61, not with feed 3, but instead with feed 4, and the crosslinking comonomers are introduced not with feed 4, but instead with feed 3, the cohesion is significantly improved, but the adhesion values—despite a low K value of only 66—are then completely inadequate.

These comparative examples 59 to 61 demonstrate overall that the surprising effect obtainable in accordance with the invention through use of suitable emulsifiers, in combination with a suitable polymerization process, namely the effect of an improvement in adhesion to different polymer substrates, in combination with sufficient cohesion (improved adhesion/cohesion balance), evidently cannot be achieved by means of the use, as known from the prior art, of chain transfer agents (even in combination with crosslinkers).

TABLE 1

Overview of the emulsifiers used in the examples

| Trade name | Brief chemical characterization | Code |
|---|---|---|
| ABEX2535 | nonionic, blend of ethoxylated fatty alcohols with isotridecyl, EO 40 | A |
| Aerosol A102 | anionic, polyethylene glycol, alkyl (C10-C12), sulphosuccinate | B |
| Aerosol MA | anionic, dihexyl sulphosuccinate | C |
| Arkopal N100 | APEO, EO 10 | D |
| Disponil A3065 | nonionic, blend of modified ethoxylated fatty alcohols, EO 30 | E |
| Disponil FES 77 | anionic, C12/C14 fatty alcohol polyglycol ether sulphate, EO 30 | F |
| Disponil LS12 | nonionic, fatty alcohol ethoxylate, linear, EO 12 | G |
| Disponil LS30 | nonionic, fatty alcohol ethoxylate, linear, EO 30 | H |
| Emulgator K30 | anionic, dodecyl sulphate | I |
| Emulsogen LCN217 | nonionic, oxo-process alcohol ethoxylate, C11, branched, EO 21 | J |
| Genapol PF20 | nonionic, polymerization product of PO and EO, 20% EO | K |
| Genapol PF40 | nonionic, polymerization product of PO and EO, 40% EO | L |
| Genapol X050 | nonionic, isotridecyl ethoxylate, EO 5 | M |
| Genapol X150 | nonionic, isotridecyl ethoxylate, EO 15 | N |
| Genapol X360 | nonionic, isotridecyl ethoxylate, EO 25 | O |
| Hostaphat 1306 | isotridecyl-poly-EO (EO 6) mono/diphosphoric acid ester, acid form | P |

TABLE 1-continued

Overview of the emulsifiers used in the examples

| Trade name | Brief chemical characterization | Code |
|---|---|---|
| Rhodapex LA300SB | anionic, C12-linear, EO 30 | Q |
| Rhodapex LA120S | anionic, C12-linear, EO 12 | R |
| Rhodasurf TR15-40 | nonionic, isotridecyl ethoxylate EO 15 | S |
| Rhodasurf TR25-25 | nonionic, isotridecyl ethoxylate about EO 25 | T |
| Sulframin B320 | anionic, isotridecyl ethoxylate EO 20 | U |

Notes:
Genapol X150 is used here synonymously to Genapol ® 1879, and Genapol X360 synonymously to Genapol ® 3214.
The code given for the emulsifiers is used in Table 2.

TABLE 2

Formula data for the examples

| 1 Ex. | 2 MS % | 3 Eth % | 4 Eth-V % | 5 VAC-V % | 6 Emulsifier code | 7 ME % | 8 ME-V % | 9 SC-R % | 10 COP |
|---|---|---|---|---|---|---|---|---|---|
| C 3 | 2.5 | 27.3 | 50 | 50 | none | 0.0 | 0.0 | 60.4 | |
| C 4 | 2.5 | 27.3 | 50 | 25 | none | 0.0 | 0.0 | 61.2 | |
| 5 | 2.5 | 27.3 | 50 | 50 | K | 2.0 | 75 | 60.4 | 12.0 |
| 6 | 2.5 | 27.3 | 50 | 25 | K | 2.0 | 75 | 61.2 | 24.1 |
| 7 | 2.5 | 27.3 | 50 | 50 | L | 2.0 | 75 | 60.4 | 12.0 |
| 8 | 2.5 | 27.3 | 50 | 50 | M | 2.0 | 75 | 60.4 | 12.0 |
| 9 | 2.5 | 27.3 | 50 | 25 | M | 2.0 | 75 | 61.2 | 24.1 |
| 10 | 2.5 | 27.3 | 50 | 50 | N | 2.0 | 75 | 60.6 | 12.0 |
| C 11 | 2.5 | 27.3 | 50 | 75 | N | 2.0 | 75 | 61.2 | |
| 12 | 2.5 | 27.3 | 70 | 50 | N | 2.0 | 75 | 61.2 | 18.3 |
| C 13 | 2.5 | 27.3 | 30 | 50 | N | 2.0 | 75 | 61.2 | |
| 14 | 2.5 | 32.0 | 50 | 50 | N | 2.0 | 75 | 61.2 | 17.9 |
| 15 | 2.5 | 27.3 | 50 | 25 | N | 1.5 | 75 | 61.2 | 11.7 |
| 16 | 2.5 | 27.3 | 50 | 25 | N | 2.0 | 75 | 60.6 | 24.1 |
| 17 | 2.5 | 27.3 | 50 | 25 | N | 2.5 | 75 | 61.6 | 42.0 |
| 18 | 2.5 | 27.3 | 70 | 25 | N | 2.0 | 75 | 61.2 | 36.6 |
| 19 | 2.5 | 27.3 | 100 | 25 | N | 1.0 | 75 | 61.2 | 10.1 |
| 20 | 2.5 | 27.3 | 50 | 25 | O | 2.0 | 75 | 61.2 | 24.1 |
| 21 | 2.5 | 27.3 | 50 | 25 | S | 2.0 | 75 | 61.2 | 24.1 |
| 22 | 2.5 | 27.3 | 50 | 25 | T | 2.0 | 75 | 61.2 | 24.1 |
| 23 | 2.5 | 27.3 | 50 | 25 | E | 2.0 | 75 | 61.2 | 24.1 |
| 24 | 2.5 | 27.3 | 50 | 25 | J | 2.0 | 75 | 61.2 | 24.1 |
| 25 | 2.5 | 27.3 | 50 | 25 | M/O = 1/1 | 1.0 | 75 | 61.2 | 4.3 |
| 26 | 2.5 | 27.3 | 50 | 25 | M/T = 1/1 | 1.0 | 75 | 61.2 | 4.3 |
| 27 | 2.5 | 27.3 | 50 | 25 | M/S = 1/1 | 1.0 | 75 | 61.2 | 4.3 |
| 28 | 2.5 | 27.3 | 50 | 25 | M/E = 1/1 | 1.0 | 75 | 61.2 | 4.3 |
| 29 | 2.5 | 27.3 | 50 | 25 | M/N = 1/1 | 1.0 | 75 | 61.2 | 4.3 |
| 30 | 2.5 | 27.3 | 50 | 25 | M/N = 1/1 | 2.0 | 75 | 61.2 | 24.1 |
| 31 | 2.5 | 27.3 | 50 | 25 | M/N = 1/1 | 2.0 | 75 | 60.8 | 24.1 |
| 32 | 2.5 | 27.3 | 100 | 25 | M/N = 1/1 | 2.0 | 75 | 61.2 | 57.2 |
| 33 | 2.5 | 22.0 | 100 | 23.3 | M/N = 1/1 | 2.0 | 75 | 61.2 | 35.8 |
| 34 | 2.5 | 27.3 | 50 | 20.5 | M/N = 1/1 | 2.0 | 75 | 61.2 | 29.3 |
| 35 | 2.5 | 27.3 | 50 | 16.6 | M/N = 1/1 | 2.0 | 75 | 61.2 | 36.2 |
| 36 | 2.5 | 27.3 | 50 | 12.5 | M/N = 1/1 | 2.0 | 75 | 61.2 | 48.1 |
| C 37 | 2.5 | 27.3 | 50 | 25 | none | 0.0 | 0.0 | 61.2 | |
| 38 | 2.5 | 27.3 | 50 | 25 | M/N = 1/1 | 2.0 | 75 | 61.2 | 24.1 |
| 39 | 2.5 | 27.3 | 50 | 25 | M/N = 1/1 | 2.0 | 75 | 61.2 | 24.1 |
| 40 | 2.5 | 27.3 | 50 | 25 | M/N = 1/1 | 2.0 | 75 | 61.2 | 24.1 |
| 41 | 1.1 | 27.3 | 50 | 25 | M/N = 1/1 | 2.0 | 75 | 60.4 | 24.1 |
| 42 | 2.5 | 27.3 | 50 | 25 | G | 2.0 | 75 | 61.2 | 24.1 |
| 43 | 2.5 | 27.3 | 50 | 25 | H | 2.0 | 75 | 61.2 | 24.1 |
| 44 | 2.5 | 27.3 | 50 | 25 | A | 2.0 | 75 | 61.2 | 24.1 |
| C 45 | 2.5 | 27.3 | 50 | 25 | R | 2.0 | 75 | 61.2 | |
| C 46 | 2.5 | 27.3 | 50 | 25 | A/R = 1/1 | 2.0 | 0.0 | 61.2 | |
| 47 | 2.5 | 27.3 | 50 | 25 | A/R = 1/1 | 2.0 | 75 | 61.2 | 24.1 |
| 48 | 2.5 | 27.3 | 50 | 25 | A/R = 1/1 | 2.0 | 100 | 61.2 | 37.0 |
| C 49 | 2.5 | 27.3 | 50 | 25 | Q | 2.0 | 75 | 61.2 | |
| C 50 | 2.5 | 27.3 | 50 | 50 | F | 2.0 | 75 | 60.4 | |
| C 51 | 2.5 | 27.3 | 50 | 50 | U | 2.0 | 75 | 60.4 | |
| C 52 | 2.5 | 27.3 | 50 | 50 | P | 2.0 | 75 | 40.4 | |
| C 53 | 2.5 | 27.3 | 50 | 50 | I | 2.0 | 75 | 60.4 | |
| C 54 | 2.5 | 27.3 | 50 | 50 | B | 2.0 | 75 | 60.4 | |
| C 55 | 2.5 | 27.3 | 50 | 25 | B | 2.0 | 75 | 61.2 | |
| C 56 | 2.5 | 27.3 | 50 | 50 | C | 2.0 | 75 | 60.4 | |
| C 57 | 2.5 | 27.3 | 50 | 50 | D | 2.0 | 75 | 60.4 | |
| C 58 | 3.5 | 27.3 | 50 | 50 | none | 0.0 | 0.0 | 61.0 | |
| C 58A | 3.5 | 27.3 | 50 | 50 | N subsequent. | 2.0 | 0.0 | | |

TABLE 2-continued

Formula data for the examples

| 1 Ex. | 2 MS % | 3 Eth % | 4 Eth-V % | 5 VAC-V % | 6 Emulsifier code | 7 ME % | 8 ME-V % | 9 SC-R % | 10 COP |
|---|---|---|---|---|---|---|---|---|---|
| C 59 | 2.5 | 22.0 | 50 | 50 | R/A = 2/1 | 1.5 | 67 | 60.8 | |
| C 60 | 2.5 | 22.0 | 50 | 51 | R/A = 1.33/1 | 1.7 | 86 | 60.3 | |
| C 61 | 2.5 | 22.0 | 50 | 50 | R/A = 1.33/1 | 1.7 | 86 | 60.9 | |

Key to Table 2:
Column 1: Ex.: Example No., C identifies comparative example
Column 2: MS: Fraction of protective colloid relative to total monomer in % by weight
Column 3: Eth: Fraction of total ethylene relative to total comonomer in % by weight
Column 4: Eth-V: Fraction of initial charge ethylene relative to total ethylene in % by weight
Column 5: VAC-V: Fraction of initial charge vinyl acetate relative to total vinyl acetate in % by weight
Column 6: Code for emulsifier or emulsifier mixture according to Table 1, emulsifier mixtures with weight fractions.
Column 7: ME: Fraction of total emulsifier relative to total monomer in % by weight
Column 8: ME-V: Fraction of initial charge emulsifier relative to total emulsifier in % by weight
Column 9: SC-R: Solids content according to formula in % by weight relative to dispersion
Column 10: COP: criterion of process

TABLE 3

Data for the polymer dispersions

| 1 Ex. | 2 SC-E % | 3 Bf20 mPaS | 4 Bf20 (60%) mPas | 5 x3, 50 nm | 6 grit ppm | 7 K value | 8 [η] dl/g |
|---|---|---|---|---|---|---|---|
| C 3 | 58.3 | 324 | 758 | 2164 | 733 | 113 | 2.45 |
| C 4 | 58.9 | 1010 | 1751 | 1420 | 204 | 125 | 2.96 |
| 5 | 56.9 | 1034 | 4872 | 870 | 342 | 115 | 2.53 |
| 6 | 57.5 | 930 | 3246 | 954 | 30 | 111 | 2.37 |
| 7 | 56.6 | 328 | 1795 | 1856 | 254 | | |
| 8 | 56.7 | 694 | 3614 | 989 | 33 | 112 | 2.41 |
| 9 | 57.9 | 1285 | 3672 | 1131 | 362 | 100 | 1.95 |
| 10 | 59.3 | 1485 | 2107 | 873 | 38 | | |
| C 11 | 59.5 | 1040 | 1335 | 973 | 898 | | |
| 12 | 59.9 | 1660 | 1745 | 1000 | 87 | 105 | 2.14 |
| C 13 | 58.2 | 1020 | 2509 | 934 | 276 | | |
| 14 | 58.2 | 1025 | 2521 | 954 | 88 | 114 | 2.49 |
| 15 | 59.6 | 2380 | 2907 | 981 | 35 | 119 | 2.70 |
| 16 | 60.7 | 5060 | 3566 | 984 | 48 | | |
| 17 | 60.1 | 3860 | 3672 | 802 | 240 | 91 | 1.64 |
| 18 | 58.7 | 2290 | 4387 | 841 | 411 | 101 | 1.99 |
| 19 | 59.6 | 3780 | 4617 | 1243 | 60 | 107 | 2.21 |
| 20 | 61.4 | 3300 | 1639 | 797 | 109 | 120 | 2.74 |
| 21 | 59.9 | 3600 | 3785 | 976 | 292 | | |
| 22 | 59.7 | 2210 | 2568 | 823 | 166 | 122 | 2.83 |
| 23 | 60.5 | 2040 | 1589 | 850 | 62 | 120 | 2.74 |
| 24 | 61.8 | 6280 | 2553 | 845 | 49 | 123 | 2.87 |
| 25 | 59.3 | 1830 | 2597 | 1343 | 65 | 117 | 2.61 |
| 26 | 60.1 | 2840 | 2701 | 1376 | 102 | 114 | 2.49 |
| 27 | 59.6 | 1125 | 1374 | 1337 | 232 | 111 | 2.37 |
| 28 | 59.5 | 2130 | 2735 | 1315 | 110 | 115 | 2.53 |
| 29 | 59.6 | 2170 | 2650 | 1466 | 97 | 113 | 2.45 |
| 30 | 59.0 | 2250 | 3710 | 992 | 329 | 100 | 1.95 |
| 31 | 59.7 | 6720 | 7808 | 1036 | 224 | 107 | 2.21 |
| 32 | 59.3 | 5600 | 7947 | 848 | 121 | 81 | 1.32 |
| 33 | 60.1 | 7900 | 7515 | 902 | 89 | 82 | 1.35 |
| 34 | 60.0 | 4440 | 4440 | 956 | 59 | 92 | 1.67 |
| 35 | 59.3 | 3000 | 4257 | 960 | 84 | 91 | 1.64 |
| 36 | 59.4 | 3940 | 5318 | 886 | 191 | 87 | 1.51 |
| C 37 | 57.1 | 1290 | 5499 | 2512 | 156 | 87 | 1.51 |
| 38 | 57.8 | 5280 | 15 862 | 865 | 140 | 100 | 1.95 |
| 39 | 57.9 | 5020 | 14 345 | 993 | 36 | 94 | 1.74 |
| 40 | 57.6 | 5680 | 18 858 | 2683 | 106 | 76 | 1.17 |
| 41 | 57.5 | 650 | 2269 | 2783 | 183 | 77 | 1.20 |
| 42 | 59.3 | 1440 | 2043 | 1275 | 40 | 102 | 2.02 |
| 43 | 60.3 | 2510 | 2160 | 669 | 119 | 117 | 2.61 |
| 44 | 61.4 | 2670 | 1326 | 782 | 81 | 119 | 2.70 |
| C 45 | 61.5 | 6380 | 3014 | 713 | 187 | 113 | 2.45 |
| C 46 | 60.9 | 4920 | 3137 | 972 | 157 | | |
| 47 | 61.0 | 4060 | 2463 | 633 | 139 | 112 | 2.41 |
| 48 | 61.3 | 3820 | 1994 | 818 | 425 | | |
| C 49 | 61.6 | 3710 | 1667 | 718 | 146 | | |
| C 50 | 58.9 | 3860 | 6690 | 588 | 191 | | |
| C 51 | 58.6 | 6200 | 12 485 | 722 | 757 | | |
| C 52 | 57.1 | 1205 | 5137 | 827 | 164 | | |
| C 53 | 58.6 | 1750 | 3524 | 883 | 200 | | |
| C 54 | 58.3 | 2070 | 4843 | 923 | 502 | 118 | 2.66 |
| C 55 | 60.0 | 2490 | 2490 | 1136 | 135 | 111 | 2.37 |
| C 56 | 58.3 | 504 | 1179 | 945 | 442 | | |
| C 57 | 56.6 | 1040 | 5693 | 915 | 262 | 109 | 2.29 |
| C 58 | 57.8 | 1300 | 3905 | 1383 | 222 | | |
| C 59 | 59.4 | 6910 | 9328 | 534 | 475 | | |
| C 60 | 58.8 | 4120 | 7507 | 1293 | 205 | | |
| C 61 | 58.1 | 4360 | 11 274 | 3434 | 851 | 66 | 0.90 |

Key to Table 3:
Column 1: Ex.: Example No., C identifies comparative example
Column 2: SC-E: experimental solids content in % by weight relative to dispersion
Column 3: Bf20: experimental Brookfield viscosity in mPas
Column 4: Bf20 (60%): viscosity calculated for a solids content of 60% from columns 1 and 2 and also from column 9 of Table 1
Column 5: x3, 50: central value of the volume distribution function of the particle size in nm
Column 6: grit: sieve residue >40 μm in ppm relative to dispersion
Column 7: K value
Column 8: Intrinsic viscosity, determined from the K value, in dl/g

TABLE 4

Adhesives properties of the polymer dispersions

| 1 Ex. | 2 TS sec | 3 Coh. N/mm² | 4 CA | 5 Adh PS N/cm | 6 Adh PET1 N/cm | 7 Adh PET2 N/cm | 8 Δ% Adh PS | 9 Δ% Adh PET1 |
|---|---|---|---|---|---|---|---|---|
| C 1 | 1.4 | 0.5 | 15 | 10.8 | 2.5 | 0.5 | — | — |
| C 2 | 2.4 | <0.1 | 10 | 4.8 | 7.6 | 3.0 | — | — |
| C 3 | 1.4 | 1.3 | 17 | 3.5 | 3.4 | | 0 | 0 |
| C 4 | 1.2 | 1.1 | 18 | 2.9 | 2.4 | 1.5 | 0 | 0 |
| 5 | 1.2 | 0.6 | 16 | 5.7 | 4.6 | 3.3 | 63 | 35 |
| 6 | 1.2 | 0.5 | 15 | 5.8 | 4.8 | 3.7 | 100 | 100 |
| 7 | 1.9 | 1.1 | 16 | 4.2 | 4.1 | 3.2 | 20 | 20 |
| 8 | 1.3 | 0.5 | 15 | 4.6 | 4.1 | 2.8 | 31 | 21 |
| 9 | 1.4 | 0.5 | 16 | 6.5 | 5.3 | 2.8 | 124 | 121 |
| 10 | 1.6 | 0.5 | 15 | 5.0 | 4.1 | 2.7 | 43 | 21 |
| C 11 | 1.4 | 0.6 | 15 | 3.4 | 3.7 | 2.8 | −3 | 9 |
| 12 | 1.2 | 0.4 | 15 | 6.9 | 4.5 | 2.5 | 97 | 32 |
| C 13 | 1.5 | 0.6 | 15 | 2.9 | 3.8 | 3.4 | −17 | 12 |
| 14 | 1.2 | 0.5 | 14 | 5.4 | 4.9 | 2.4 | 54 | 44 |
| 15 | 1.4 | 0.6 | 14 | 4.9 | 4.7 | 2.4 | 69 | 96 |
| 16 | 1.2 | 0.4 | 15 | 5.3 | 4.8 | 2.6 | 83 | 100 |

TABLE 4-continued

Adhesives properties of the polymer dispersions

| 1 Ex. | 2 TS sec | 3 Coh. N/mm² | 4 CA | 5 Adh PS N/cm | 6 Adh PET1 N/cm | 7 Adh PET2 N/cm | 8 Δ% Adh PS | 9 Δ% Adh PET1 |
|---|---|---|---|---|---|---|---|---|
| 17 | 2.2 | 0.3 | 14 | 6.6 | 4.9 | 2.3 | 128 | 104 |
| 18 | 1.2 | 0.3 | 16 | 6.1 | 5.4 | 2.5 | 110 | 125 |
| 19 | 1.4 | 0.6 | 17 | 5.6 | 4.9 | 2.6 | 93 | 104 |
| 20 | 1.9 | 0.5 | 14 | 5.1 | 4.7 | 2.7 | 76 | 96 |
| 21 | 1.4 | 0.4 | 18 | 6.2 | 5.2 | 2.3 | 114 | 117 |
| 22 | 1.8 | 0.5 | 15 | 5.4 | 4.7 | 2.5 | 86 | 96 |
| 23 | 1.8 | 0.5 | 14 | 6.1 | 4.5 | 2.5 | 110 | 88 |
| 24 | 1.2 | 0.5 | 15 | 5.7 | 3.7 | 2.1 | 97 | 54 |
| 25 | 1.6 | 0.8 | 16 | 5.2 | 4.2 | 2.7 | 79 | 75 |
| 26 | 1.4 | 0.8 | 15 | 4.6 | 4.6 | 2.8 | 59 | 92 |
| 27 | 1.2 | 0.8 | 15 | 4.5 | 4.1 | 2.9 | 55 | 71 |
| 28 | 1.2 | 0.7 | 17 | 4.7 | 4.4 | 2.8 | 62 | 83 |
| 29 | 1.6 | 0.7 | 15 | 5.4 | 5.6 | 2.8 | 86 | 133 |
| 30 | 1.4 | 0.3 | 15 | 6.5 | 5.6 | 2.8 | 124 | 133 |
| 31 | 1.2 | 0.4 | 15 | 5.9 | 5.2 | 2.5 | 103 | 117 |
| 32 | 1.2 | 0.3 | 15 | 13.9 | 6.1 | 2.5 | 379 | 154 |
| 33 | 1.2 | 0.3 | 16 | 5.4 | 4.7 | 3.3 | 86 | 96 |
| 34 | 1.2 | 0.3 | 15 | 7.0 | 5.9 | 2.5 | 141 | 146 |
| 35 | 1.4 | 0.3 | 15 | 10.8 | 7.5 | 2.6 | 272 | 213 |
| 36 | 1.2 | 0.3 | 14 | 11.7 | 6.9 | 2.7 | 303 | 188 |
| C 37 | 1.8 | 1.1 | 15 | 2.9 | 3.1 | 1.1 | 0 | 0 |
| 38 | 1.2 | 0.4 | 15 | 5.4 | 5.3 | 2.3 | 86 | 71 |
| 39 | 1.2 | 0.4 | 15 | 4.8 | 4.8 | 2.9 | 66 | 100 |
| 40 | 1.6 | 0.4 | 18 | 8.0 | 4.7 | 2.5 | — | — |
| 41 | 1.2 | 0.3 | 18 | 10.0 | 5.5 | 2.2 | — | — |
| 42 | 1.2 | 0.4 | 15 | 5.2 | 4.3 | 2.8 | 79 | 79 |
| 43 | 1.2 | 0.5 | 16 | 4.6 | 3.6 | 2.0 | 59 | 50 |
| 44 | 1.3 | 0.6 | 16 | 5.4 | 4.3 | 2.0 | 86 | 79 |
| C 45 | 1.4 | 0.5 | 16 | 2.4 | 2.7 | 2.4 | −17 | 13 |
| C 46 | 1.8 | 0.9 | 15 | 3.2 | 1.2 | 1.5 | 10 | −50 |
| 47 | 1.3 | 0.5 | 15 | 5.4 | 3.0 | 2.0 | 86 | 25 |
| 48 | 1.8 | 0.5 | 14 | 6.6 | 3.3 | 2.0 | 128 | 38 |
| C 49 | 1.6 | 0.6 |  | 4.1 | 1.9 | 1.9 | 41 | −21 |
| C 50 | 1.4 | 0.6 |  | 4.5 | 1.7 |  | 29 | −50 |
| C 51 | 1.2 | 0.5 |  | 4.6 | 1.5 |  | 31 | −56 |
| C 52 | 1.2 | 0.4 |  | 3.0 | 2.9 |  | −14 | −15 |
| C 53 | 1.6 | 0.6 |  | 2.9 | 2.6 |  | −17 | −24 |
| C 54 | 1.2 | 0.7 |  | 3.3 | 4.9 | 2.1 | −6 | 44 |
| C 55 | 1.2 | 0.6 |  | 2.8 | 4.4 | 2.7 | −3 | 83 |
| C 56 | 2.4 | 0.6 |  | 4.1 | 2.5 |  | 17 | −26 |
| C 57 | 1.2 | 0.4 | 14 | 5.3 | 3.9 |  | 51 | 15 |
| C 58 | 1.4 | 1.3 | 17 | 3.1 | 3.0 | 2.3 | 0 | 0 |
| C 58A | 1.6 | 1.3 | 16 | 3.3 | 3.0 | 2.4 | 6 | 0 |
| C 59 | 1.4 | 0.04 | 12 | 14.4 | 15.3 |  |  |  |
| C 60 | 2.2 | 0.10 | 13 | 4.4 | 3.0 |  |  |  |
| C 61 | 3.4 | 0.80 | 13 | 2.4 | 1.8 |  |  |  |

Key to Table 4:
Column 1: Ex.: Example No., C identifies comparative example
Column 2: TS: Setting rate, measured as TS in sec
Column 3: Coh.: Cohesion determined as thermal stability in N/mm²
Column 4: CA: Cumulative adhesion
Column 5: Adh PS: Adhesion/peel strength in N/cm on polystyrene Sidaplax ® PF 90 at a removal speed of 5 mm/min
Column 6: Adh PET1: Adhesion/peel strength in N/cm on polyethylene terephthalate Hostaphan ® RN125 at 10 mm/min
Column 7: Adh PET2: Adhesion/peel strength in N/cm on polyethylene terephthalate Hostaphan ® RN125 at 900 mm/min
Column 8: Δ% Adh PS: percentage change in adhesion to polystyrene as per column 5, based on a polymer prepared under otherwise identical conditions but in the absence of emulsifier
Column 9: Δ% Adh PET1: percentage change in adhesion to polyethylene terephthalate as per column 6, based on a polymer prepared under otherwise identical conditions but in the absence of emulsifier

The invention claimed is:

1. A process for preparing a vinyl acetate-ethylene copolymer by means of free-radically initiated emulsion polymerization of vinyl acetate and 18% to 34% by weight of ethylene, based on the total weight of the vinyl acetate and ethylene monomers, and, optionally, further comonomers, wherein no alkylphenol ethoxylate is present during the polymerization and wherein polymerization takes place in the presence of at least one protective colloid and of 0.5% to 4% by weight, based on the total amount of monomers, of at least one nonionic, ethoxylated emulsifier with a branched or linear alkyl radical or at least one ethylene oxide-propylene oxide copolymer, and in the absence of chain transfer agent, and, before the initiation of the polymerization, 10% to 70% by weight of the vinyl acetate monomer and 40% to 100% by weight of the ethylene monomer are included in the initial charge, up to 100% by weight of the protective colloid fraction is included in the initial charge, at least 25% by weight of the emulsifier fraction is included in the initial charge, and the remaining fractions of monomers, protective colloid and emulsifier are metered in during the polymerization, the procedure being such that the criterion of process COP meets the condition
2.5≤COP≤70, where
COP=100×($ETM^{2.5}$×$ETV^{1.25}$×$EA^{2.5}$×$EV^{1.5}$×$VV^{-1}$),
where
ETM=MEt/MM, ETV=MEtV/MEt, EA=100 ME/MM, EV=MEV/ME and VV=MVacV/MVac, where
MEt=total mass of ethylene in kg, MM=total mass of monomer in kg, MEtV=mass of ethylene charge in kg, ME=total mass of emulsifier in kg, MEV=mass of emulsifier charge in kg; MVacV=mass of vinyl acetate charge in kg, and MVac=total mass of vinyl acetate in kg.

2. The process according to claim 1, wherein exclusively vinyl acetate and ethylene are copolymerized, the ethylene fraction being 22% to 32% by weight, based on the total weight of the monomers.

3. The process according to claim 1, wherein use is made as protective colloid of one or more partially hydrolysed polyvinyl alcohols having an average degree of hydrolysis of 86 to 96 mol % and a mass-average degree of polymerization of 600 to 2000,
and/or
one or more fully hydrolysed polyvinyl alcohols having an average degree of hydrolysis of 96.1 to 99.9 and an average degree of polymerization of 600 to 3500,
and/or
one or more fully hydrolysed ethylene-modified polyvinyl alcohols having an average degree of hydrolysis of 94.5 to 99.9 and a mass-average degree of polymerization of 500 to 5000,
and/or
hydroxyethylcellulose, with a viscosity of a 2% strength by weight aqueous solution of ≤1500 mPas.

4. The process according to claim 1, wherein the protective colloid is used in an amount of 1% to 4% by weight, based on the total weight of the monomers, in the polymerization.

5. The process according to claim 1, wherein the emulsifier is used in an amount of 0.8% to 3% by weight, based on the total weight of the monomers, in the polymerization.

6. The process according to claim 1, wherein use is made of one or more emulsifiers selected from the group consisting of nonionic, ethoxylated fatty alcohols with a branched or linear alkyl radical, the alkyl radical having 4 to 40 C atoms and being ethoxylated in each case with 2 to 60 ethylene oxide units, and copolymers of ethylene oxide (EO) and propylene oxide (PO) with an ethylene oxide fraction of 10% to 40% by weight and a molar mass of 1500 to 3000.

7. The process according to claim 1, wherein only one single emulsifier is used, said emulsifier being selected from the group consisting of nonionic isotridecyl ethoxylates having 2 to 60 EO units, nonionic, ethoxylated linear fatty alcohols having 4 to 40 EO units, and copolymers of ethylene oxide (EO) and propylene oxide (PO) having an ethylene oxide fraction of 10% to 40% by weight.

8. The process according to claim 1, wherein a mixture of emulsifiers is used, said mixture being selected from the group consisting of a) mixtures of two nonionic, ethoxylated isotridecyl alcohols, one component containing 4 to 18 EO units and the second component having 12 to 40 EO units,
b) mixtures of a nonionic, ethoxylated isotridecyl alcohol having 2 to 60 EO units and an ethoxylated, linear nonionic emulsifier selected from the group consisting of linear fatty alcohols having 4 to 40 EO units and copolymers of ethylene oxide (EO) and propylene oxide (PO), and
c) mixtures of one or more nonionic, ethoxylated isotridecyl alcohols having 2 to 60 EO units,
or of one or more nonionic, ethoxylated linear fatty alcohols having 4 to 40 EO units,
or one or more copolymers of ethylene oxide (EO) and propylene oxide (PO) with an ethylene oxide fraction of 10% to 40% by weight,
in each case with one or more ethoxylated anionic emulsifiers.

9. The process according to claim 1, wherein initiation is carried out using a combination of hydrogen peroxide and sodium formaldehyde-sulphoxylate.

10. The process according to claim 1, wherein vinyl acetate is included in the initial charge, prior to initiation, in a fraction of 15% to 50% by weight.

11. The process according to claim 1, wherein ethylene is included in the initial charge, prior to initiation, in a fraction of 50% to 75% by weight.

12. The process according to claim 1, wherein the emulsifier fraction is included at 55% to 85% by weight in the initial charge prior to initiation of the polymerization.

13. The process according to claim 1, wherein the protective colloid fraction is included at 100% by weight in the initial charge prior to initiation of the polymerization.

14. The process according to claim 8, wherein the one or more ethoxylated anionic emulsifiers are selected from the group consisting of linear alkyl ether sulphates based on linear fatty alcohols having 4 to 40 C atoms and 4 to 40 EO units, and monoesters of sulphosuccinic acid with linear fatty alcohols having 4 to 40 C atoms and 4 to 40 EO units.

\* \* \* \* \*